(12) United States Patent
Blackburn et al.

(10) Patent No.: US 11,216,781 B2
(45) Date of Patent: *Jan. 4, 2022

(54) SYSTEM FOR MANAGEMENT AND VERIFICATION OF CODE COMPLIANCE

(71) Applicant: Scientia Potentia Est., LLC, Charleston, SC (US)

(72) Inventors: Jeremy Blackburn, Charleston, SC (US); Justin Southward, Charleston, SC (US); Tim McVicker, Charleston, SC (US); W. Kurt Taylor, N. Charleston, SC (US); Karl David, Charleston, SC (US); Austi Critchfield, Clearwater, FL (US); Michael Lu, N. Charleston, SC (US)

(73) Assignee: Scientia Potentia Est., LLC, Charleston, SC (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/810,782

(22) Filed: Mar. 5, 2020

(65) Prior Publication Data

US 2020/0410445 A1   Dec. 31, 2020

Related U.S. Application Data

(63) Continuation-in-part of application No. 16/510,642, filed on Jul. 12, 2019, and a continuation-in-part of
(Continued)

(51) Int. Cl.
*G06Q 10/08* (2012.01)
*G06Q 50/16* (2012.01)
(Continued)

(52) U.S. Cl.
CPC .......... *G06Q 10/0875* (2013.01); *G01W 1/10* (2013.01); *G06Q 10/0833* (2013.01);
(Continued)

(58) Field of Classification Search
CPC .......... G06Q 10/0875; G06Q 10/0833; G06Q 50/165; H04L 9/0643; H04L 2209/38;
(Continued)

(56) References Cited

U.S. PATENT DOCUMENTS 7,031,930 B2   4/2006   Freeman et al.
7,330,821 B2   2/2008   Wares
(Continued)

OTHER PUBLICATIONS

Hughes, Dave, The Impact of Blockchain Technology on the Construction Industry:, Feb. 19, 2017; medium.com, 8 pages. (Year: 2017).
(Continued)

*Primary Examiner* — Garcia Ade
(74) *Attorney, Agent, or Firm* — Kim and Lahey Law Firm LLC; Douglas W. Kim

(57) ABSTRACT

This system is a decentralized computerized system for administration and management of a construction project having a server configured to: receive a building information model from a design computing device, transmit to the bill of material to a supply computer device informing a third-party supplier to deliver the materials to the construction site, receive a material delivery information, receive material installation information, receive an internal and external inspection information debit a first account associated with the construction site and credit a second account associated with an external inspector, create a certification of code compliance. The server can be in communications with a site computer device is physically associated with the construction site that can be configured to receive the bill of materials the material delivery information from a site input interface, receive the material installation information, receive the internal and external inspection information.

20 Claims, 31 Drawing Sheets

Related U.S. Application Data application No. 16/510,634, filed on Jul. 12, 2019, now Pat. No. 10,713,737, which is a continuation-in-part of application No. 16/452,076, filed on Jun. 25, 2019, said application No. 16/510,642 is a continuation-in-part of application No. 16/452,076, filed on Jun. 25, 2019.

(51) Int. Cl.
*H04L 9/06* (2006.01)
*H04W 4/80* (2018.01)
*G01W 1/10* (2006.01)
*G06F 8/65* (2018.01)

(52) U.S. Cl.
CPC ......... *G06Q 50/165* (2013.01); *H04L 9/0643* (2013.01); *H04W 4/80* (2018.02); *H04L 2209/38* (2013.01)

(58) Field of Classification Search
CPC . H04L 2209/56; H04L 9/3239; H04L 9/3231; H04W 4/80; H04W 12/106; H04W 4/33; H04W 4/35; G01W 1/10
USPC ......................................................... 705/29
See application file for complete search history.

(56) References Cited

U.S. PATENT DOCUMENTS

| | | | |
|---|---|---|---|
| 7,546,576 | B2 | 6/2009 | Egli |
| 7,898,403 | B2 | 3/2011 | Ritter et al. |
| 10,338,913 | B2 * | 7/2019 | Franchitti .............. G06N 5/022 |
| 2006/0137015 | A1 | 6/2006 | Fahrny et al. |
| 2007/0220342 | A1 | 9/2007 | Vieira et al. |
| 2010/0058364 | A1 | 3/2010 | Sherrill et al. |
| 2011/0060659 | A1 | 3/2011 | King et al. |
| 2017/0031676 | A1 * | 2/2017 | Cecchetti ................. G06F 8/65 |
| 2019/0333169 | A1 | 10/2019 | Povar |
| 2019/0377904 | A1 | 12/2019 | Sinha et al. |
| 2020/0034766 | A1 | 1/2020 | Borges |

OTHER PUBLICATIONS

Blockchain Technology in the Construction Industry: Digital Transformation for High Productivity, Dec. 2018; Ice: Institution of Civil Engineers, 52 pages. (Year: 2018).

* cited by examiner

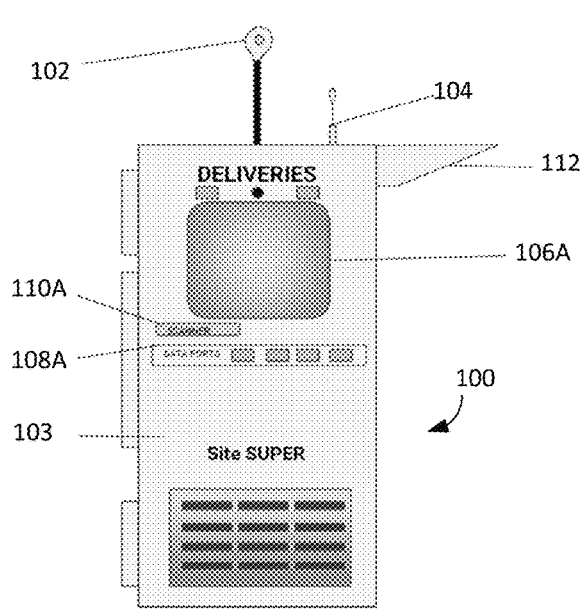
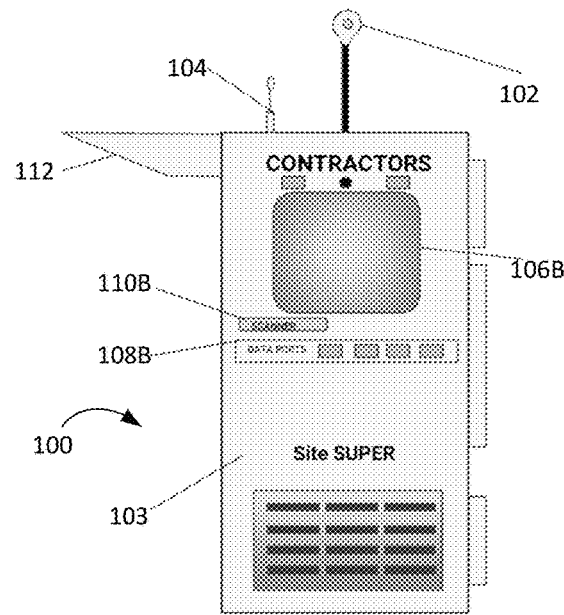
Fig. 1A     Fig. 1B
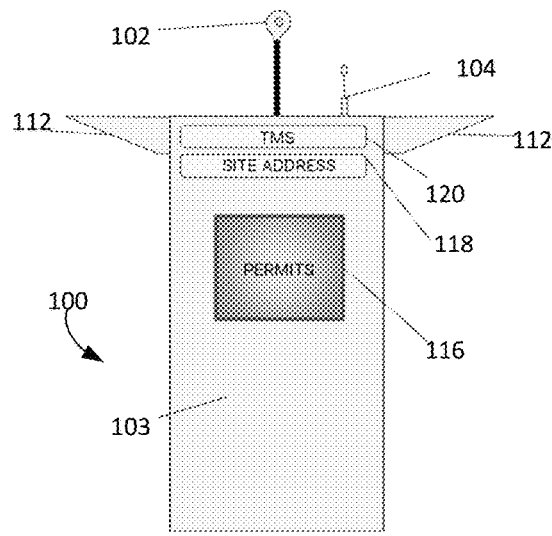
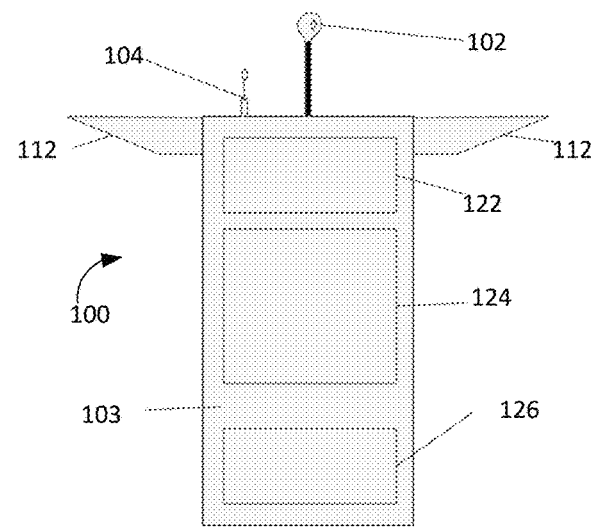
Fig. 1C     Fig. 1D

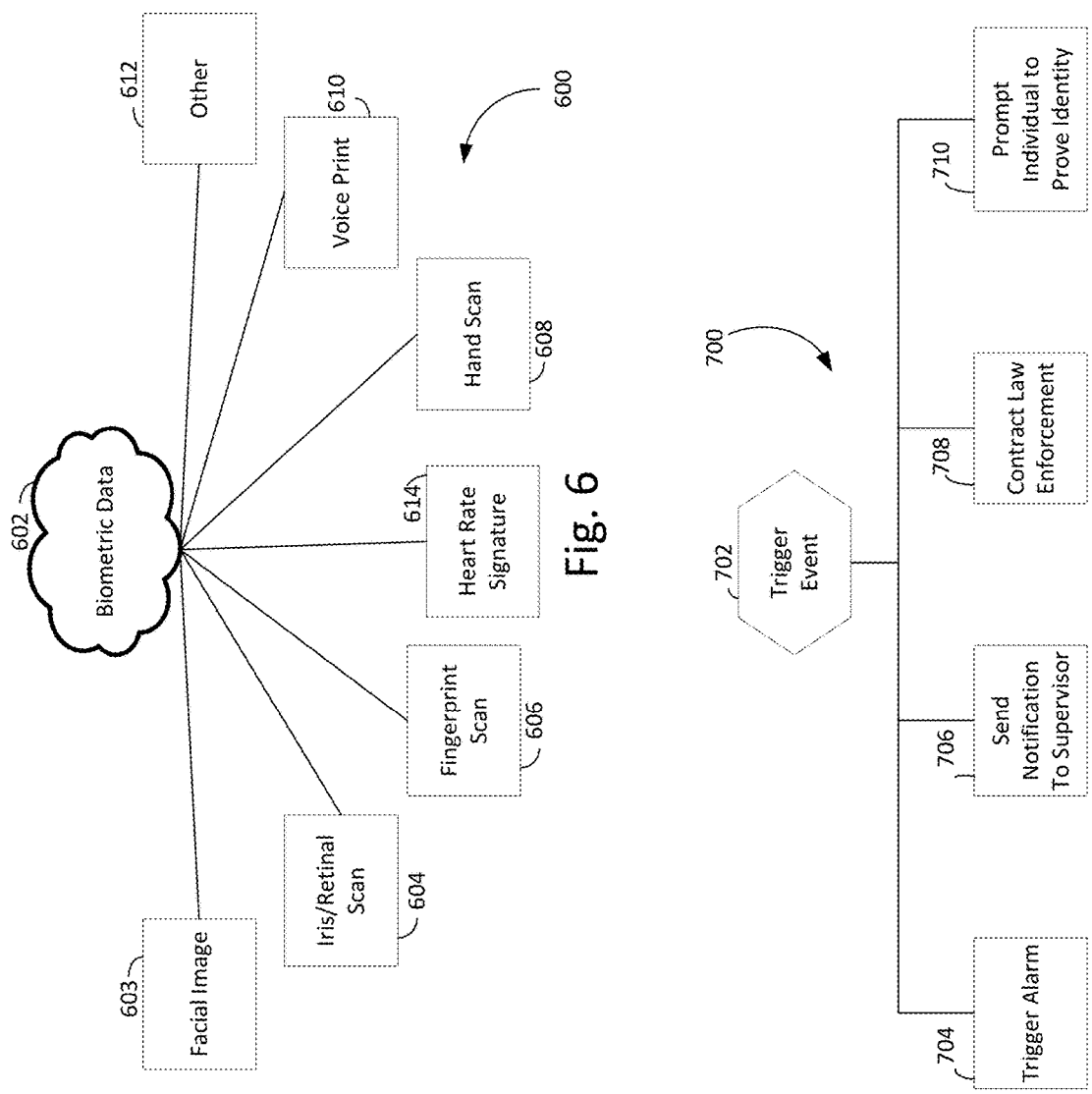

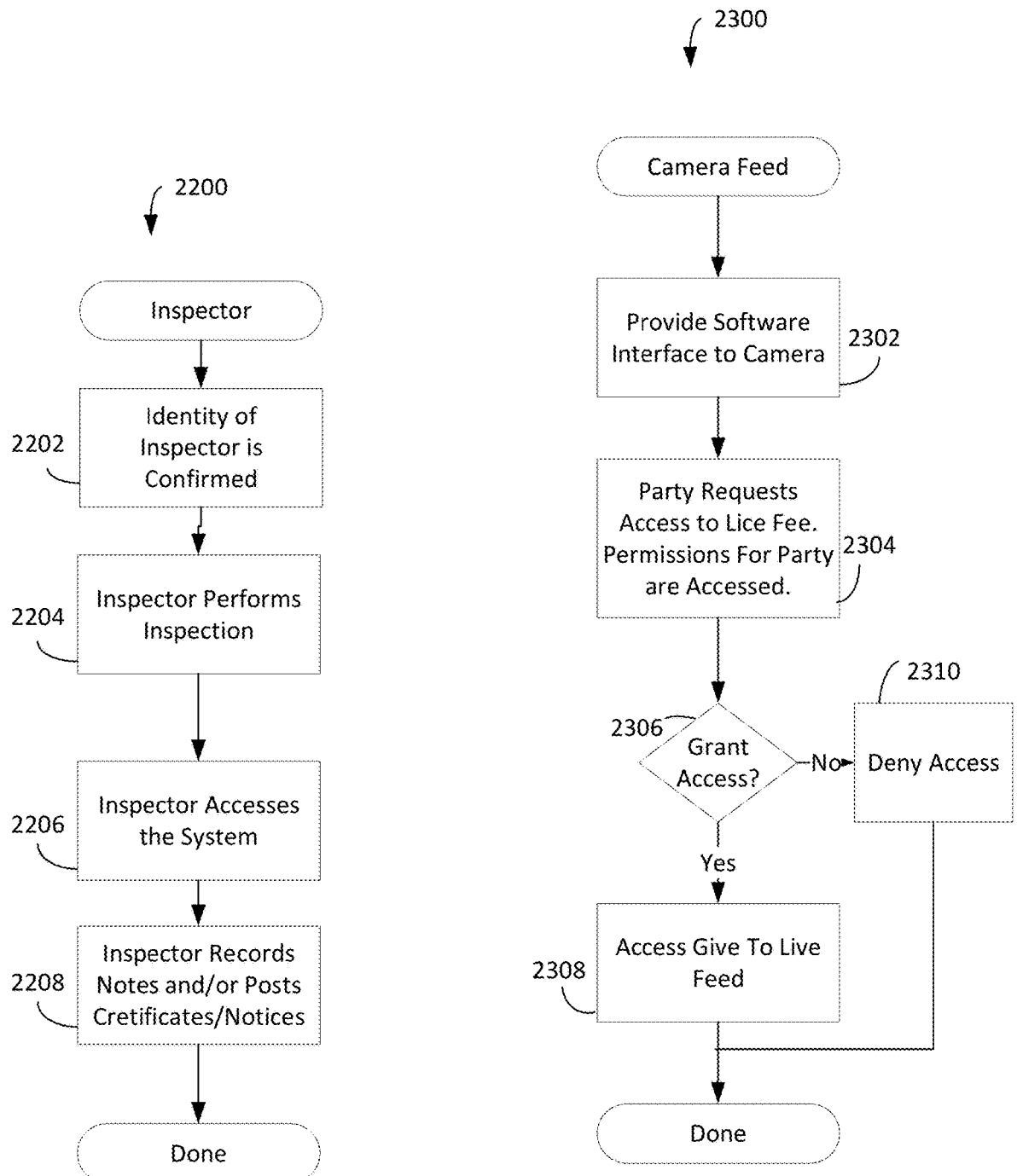

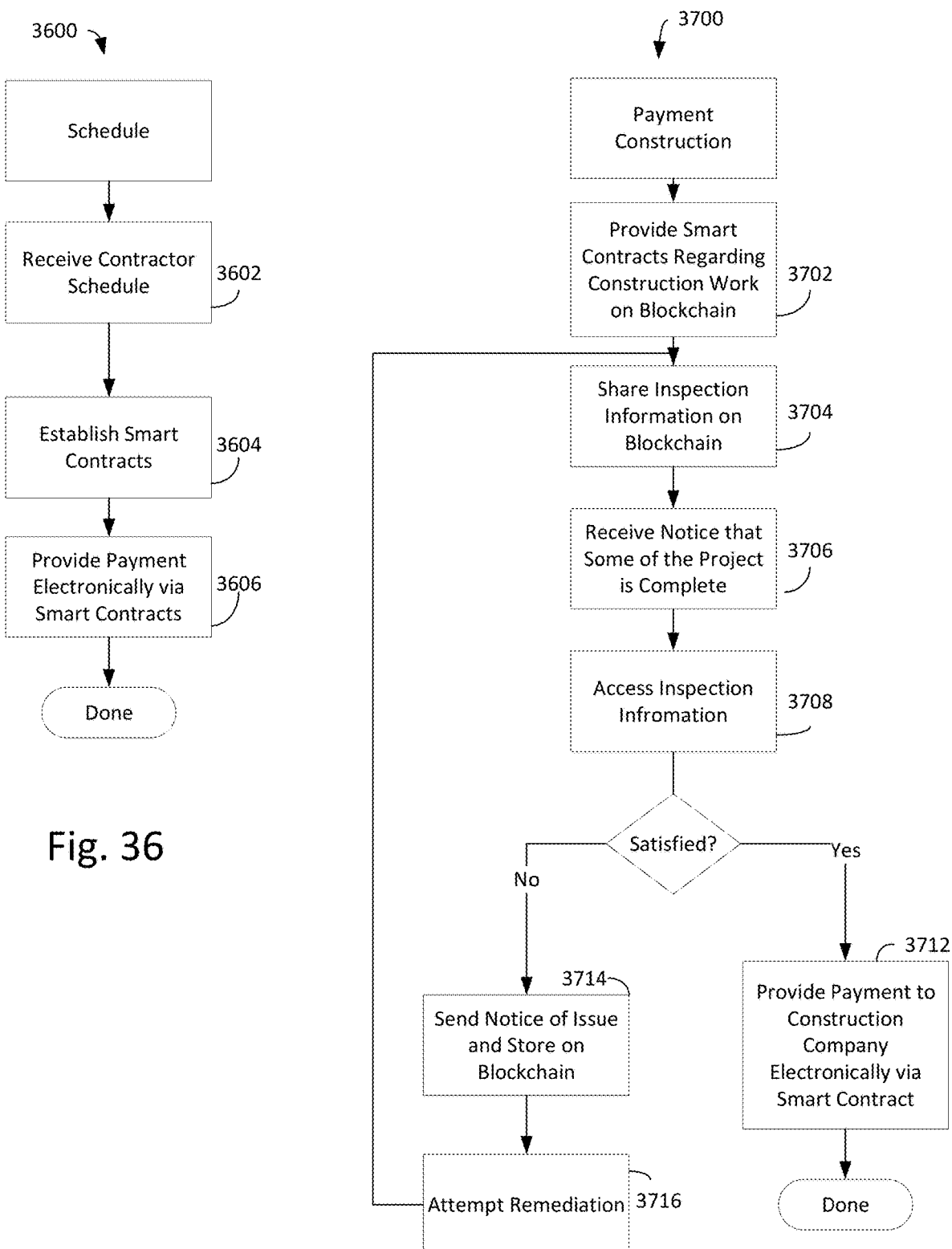

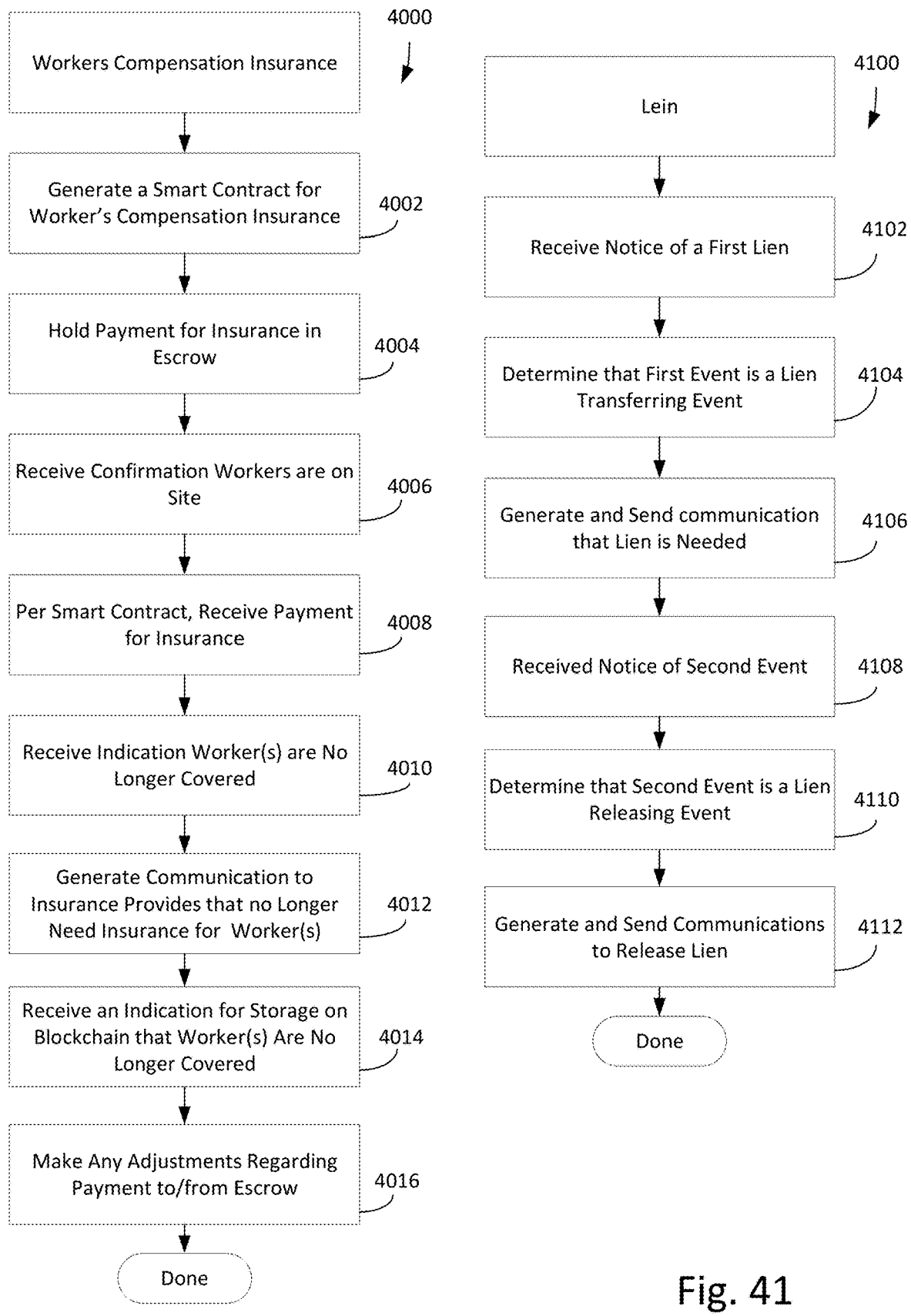

SYSTEM FOR MANAGEMENT AND VERIFICATION OF CODE COMPLIANCE

RELATED APPLICATIONS

The present application is a continuation in part of U.S. patent application Ser. No. 16/452,076, entitled "Autonomous Site Supervisor Management System for Construction Sites," filed on Jun. 25, 2019, U.S. patent application Ser. No. 15/610,634, entitled "Use of A Persistent Storage Reference Construction Metadata and to Use Smart Contracts for a Construction Project," filed on Jul. 17, 2019, and U.S. patent application Ser. No. 16/510,642 entitled "Use of a Blockchain-Based Distributed Ledger and Smart Contracts for a Construction Project" filed on Jul. 17, 2019 to which priority is claimed and which all are incorporated reference.

BACKGROUND

1) Field of the System

This system is directed to a system that is digitally tied to a construction site, provides for multiple party information verifications and creates an immutable record for management and verification of code compliance of a construction project

2) Background

For any construction project, there is a systematic and logical workflow that increases the success of the project. Items and individuals that are included in a successful project include approved architectural design, approved construction materials, licensed, qualified and experienced workers or labor, permits, insurance, financing, and inspections. The chances of success of a construction project can be increased when the commencement of the project includes a structured process with management and verification of the items and individuals for the project. For example, the architectural design can include a bill of materials representing construction materials to be used for the construction project. The bill of materials can be sent to suppliers or manufacturers so that the cost of the bill or materials is known prior to ordering the materials and finalizing the architectural plans. Based upon the materials, sourcing confirmation, actual materials confirmation, and licenses, qualified and experienced workers may be needed for the construction project so that is the workers schedule (e.g. availability) is known and confirmed for the project schedule prior to commencement of the project so that delays can be avoided.

One disadvantage of the current construction process is the lack of accountability, verification and reliability of information related to the items and individuals needed at the beginning of a construction project. For example, once item necessary for a construction project is a building permit which is written authorizations issued by a regulatory authority (e.g. city or county government) to allow for a construct a project to proceed. These permits are needed for items such as new construction, modifications, and additions to existing buildings, including structural, plumbing, mechanical, electrical, manufactured dwelling, boiler, and elevator work.

Typically, these permits are generated a one location, physically delivered to the construction site and displayed. For example, one regulation states that "Building permits shall be procured from the building official before performance of any work or construction of any character, whether permanent or temporary. In some cases, the permits must be displayed within 48 hours after it is issued, and readily visible from an adjacent public street throughout the term of the work. Typically, these permits are in physical (paper) form and placed onsite and are susceptible to damage, theft and other loss negatively impacting the project. Management and verification of permits is just once aspect that needs improvement over the current practices in the construction industry.

Building codes also impact the construction site and are a set of rules that specify the standards for a construction project. Codes impact the architectural design, constructions materials, worker's license and experience the construction process. A building code may require that building materials be installed in accordance with manufacturer's specifications and warranty regulations. This requires management and verification of the materials to ensure regulatory code compliance and proper installation according to the specifications. Tracking this requirement can be difficult because the materials can be hidden from view or otherwise inaccessible. The issue with the current systems is that there is no established verifications process to ensure that the materials actually used are the ones that were designated in the codes or architectural design. While a building inspection is designed to reduce this risk, inspections of components during and after construction can not be properly verified as they can be obscured. For example, plumbing will be covered by walls, fixtures, floors and the like and inspection can be impossible.

It would be an advantage to have a system that can receive plans and specifications from architects that are approved for construction and confirm that the materials specified are used and installed by the appropriate workers and under the proper conditions.

Verification is important because suppliers and contractors are known to substitute lesser quality materials or even out of code material for the project for financial reasons. Inspectors can provide false or misleading information to sign off on a project when in fact the inspection preformed and that recorded are not consistent. When an inspection is preformed, the record of the inception is not consistently maintained. Recordation ranges from physical forms to smart phone images to proprietary inspection system such as a computerized system offered by Inspection Support Network®. The data is stored and maintained by the system provider so that data security is dependent upon the system provider. t would be advantageous to have a permanent verified record of code compliance that can be referenced by third parties prior, during and after commencement of the construction project and for future verification of aspects of the project.

There have been since attempts to improve the construction process such as U.S. Pat. No. 7,898,403 that is directed to a method and system for detecting construction equipment process failures. A database is populated from information from a third-party source and a process failure report is provided for processes that are outside a norm assigned to the construction equipment asset. U.S. Pat. No. 7,031,930 is directed to a method and system for managing complex construction projects by monitoring subcontractors in real time, against a system after commencement of the project. U.S. Pat. No. 8,004,397 is directed to a mountable reporting source comprising a controller coupled with an interrogating component configured for automatically receiving an identifier which is unique to an asset having a position determining component. Again, this is directed to the construction process itself, not management and verification of code compliance.

To make code compliance more difficult, especially with verifications of materials, confirmation of deliveries at construction sites is limited, requiring the mere signature or sign off of any individual on the construction site in order for the deliveries to be accepted, or in many cases, deliveries are made to unattended sites with delivery drivers' self-verifying the delivery.

Further, deliveries may be made regardless of weather conditions, resulting in some materials being subject to rain and other weather conditions that may affect the materials that are delivered. This can result in legacy issues for warranties and quality. At large sites, errors may occur with deliveries to the wrong location or wrong contractor as different trades may use common materials. When materials are delivered, installed, or otherwise used in weather conditions that are contrary to the manufacturer specifications, significant damage and liability can be introduced to the construction project. For example, when moisture gets trapped behind the building material stucco, the moisture can produce "stucco tears," which result in discoloration of the stucco beneath windows or cause the formation of mold and mildew, which can escalate into an infestation of black mold. Manufacturer have certain requirements for stucco and its installation and can require certain humidity ranges and temperature ranges. It would be advantageous for a system to record the weather of the installation for this and other materials.

SUMMARY

In accordance with an exemplary embodiment,

BRIEF DESCRIPTION OF THE DRAWINGS

FIGS. 1A-1D depict various side views of aspects of the system.

FIG. 6 depicts various types of biometric data that may be gathered.

FIG. 7 illustrates types of events that may be triggered using the system.

FIGS. 21-26 depict flowcharts showing steps that may be performed.

FIGS. 36-43 depicts a flowchart of steps performed by the system.

DETAILED DESCRIPTION

Figure 1E:
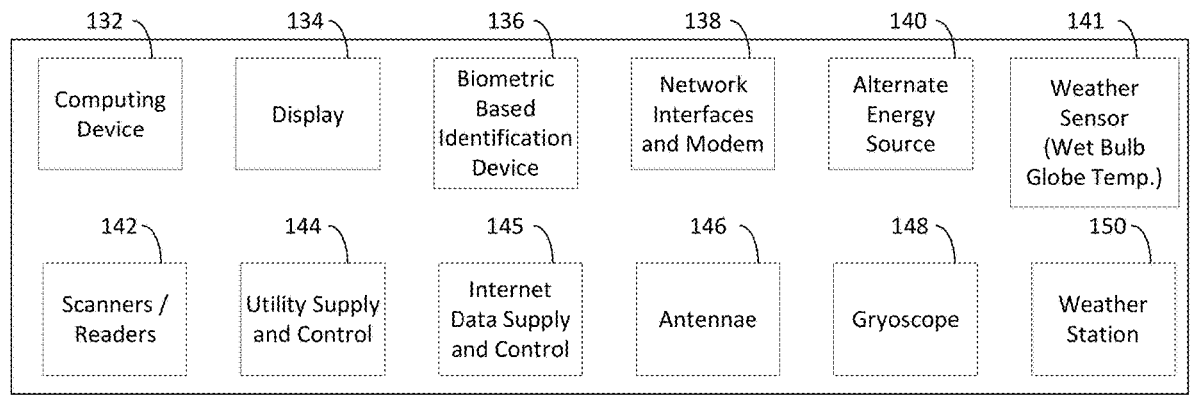
FIG. 1E depicts a block diagram of components of aspects of the system.

Systems at nearby construction sites may be interconnected using image capture devices, such as still cameras or video cameras, to provide security not only to the site on which it is stationed, but nearby sites as well. The processing of images from the multiple interconnected systems may be performed via processing logic to identify security issues.

Confirmation of actual workers on site, and correspondingly, coverage by workers compensation insurance, licensing of workers, training for tools and jobs, and possession and usage of appropriate safety equipment is elusive. Onsite accident and claims management with immediate access to emergency care facilities and hazardous materials protocols is rare.

A system utilizing biometrics for verification of actual workers on the construction site to correspond with professional licenses and work certifications for verified payroll and insurance coverage would optimize processes and ensure coverage. Onsite verification of processes, inspections, completions and deliveries with automated adjustments and notifications with confirmation would ensure increased productivity, especially if accessible in real time at the construction site. Real time construction plans with corresponding training and construction manuals would improve quality control and efficiency but rarely exist.

Automated verification of quantities, quality, and correct product deliveries along with after delivery tracking of materials with accountability is seldom used. Designated delivery areas with geofenced control and tracking of materials once delivered would help prevent loss. Confirmation of products integrated at a construction site provides transparency regarding sourcing, warranties, as well as future reference during the structure and individual products life of use.

The system seeks to identify all individuals entering or leaving the construction site and persistently records this information in a storage, such as in a database. Such records may be useful in a number of different contexts. The biometric-based identification device may be a camera or other image capture device. Facial recognition may be performed on the captured facial image to attempt to identify the individual. Alternative biometric-based identification devices, such as voice recognition systems, retinal scans, fingerprint scanners, hand scanners, voice print devices and the like may be utilized in the alternative or in addition to other biometric devices. As a last resort, the computing logic may allow authorized individuals to manually enter the presence of another authorized individual.

The system may record the date and time of events such as the arrival and departure of individuals, supplies, third parties and the like to and from the construction site. The system may also record the date and current weather conditions. The system may confirm that the workers were at the construction site for the planned time periods and can record the hours that the workers worked to ensure that the workers are paid correctly. The system may also compare the worker arrival and departure information to ensure that the worker arrives in a timely fashion and on the proper date for appropriate work items. The weather information may be used to modify the schedule for workers so that workers are not working during inclement weather and to record the weather conditions at the time that the worker worked. Additionally, the processing logic may prevent work from being performed if said work would violate manufacturer guidelines for installation/application. The recorded information may also be useful in providing or disproving insurance claims or worker's compensation claims and be useful to confirm installations or adherence to manufacturer specifications related to temperature or weather-related conditions.

If the system determines that an unidentified individual attempted to enter the construction site, the system may take the appropriate responses, such as sending notifications, triggering alarms and/or contacting law enforcement authorities or security. The decision as to the appropriate response may be determined by, the date, the time current weather conditions, or related factor.

The system may also control access to tools, equipment, materials and areas of the construction site. As to tools, equipment and materials, the system may confirm the identity of an individual and grant access to certain tools and equipment using smart locks and/or other technology. The system may limit the dates and duration of access to the tools/equipment such that the tools/equipment must be returned within the specified date/time window. An onsite scanner can be used to identify tools, equipment, materials and areas of the construction site such as by using barcode or other identifying information to track these items, associate them with ah worker or area of the construction site.

The smart locks may also be used to limit access to certain portions of the project under construction. An individual's right to a portion of the construction site may be dictated by permissions that are stored through each party involved in the construction process. This may eliminate keyed entry during the process and provide further verifications of individual or group access.

The individuals on the construction site may be prompted to wear certain wearables that provide useful information to the system. For instance, individuals may be prompted to wear location tracking devices, such as GPS devices, Bluetooth, radio frequency identification (RFID) devices, ultra-high frequency (UHF) and/or beacon-based devices. The use of the wearables helps to perform geofencing within the construction site. The location tracking provided by the wearable helps the system to monitor the location of individuals on the construction site on an ongoing basis. The permissions may define what portions of the construction site an individual may access. Ongoing monitoring may indicate that an individual is attempting to enter a location where the individual is not permitted. This may trigger a response as described herein. A signal may be sent to the vest or wearable to trigger a visual or audio cue that the individual is not in a permitted area. In addition, individuals may be requested to wear wearables that track biometric information, such as heart rate, body temperature, respiration rate and blood pressure. This information may be tracked and stored on an ongoing basis. When the biometric data gathered from these wearables are outside an acceptable range, potentially indicating physical danger or injury, appropriate response actions may be taken such as notifying the individual, notifying a supervisor and/or contacting medical personnel. Collected data may be used to verify a multitude of factors such as reported accidents, incidents of theft, hours worked, and the like. The individuals on the construction site may be prompted to wear certain safety equipment related to their assigned tasks. The confirmation of the safety equipment may be useful in the prevention of accidents or in the prevention or lessening of injuries in the event of an accident. In the event that an accident occurs, the system can record information about the accident such as the worker involved, the equipment being used, physical location, other worker in the area, video capture from camera in the area, material involved, tools and equipment involved and record the information for reporting and future study.

The system may track materials. When a delivery is made, the delivery person may enter delivery notes and the delivered materials may be scanned or read to confirm the quantity and nature of what has been delivered and current weather conditions. The system can record weather information at the location and time where the materials are received, stored and installed. Recording weather information at the construction site allows for autonomous confirmation of weather conditions that do not rely solely on third party sources. The system may track the movement of materials, tools and equipment at the construction site. Scanning technology such as RFID readers, UHF readers and/or the like may be utilized to assist the location tracking for tools, equipment and materials. The tracking of materials helps reduce the risk of theft. For example, the tracking solution may indicate instances of possible theft, such as when the materials are leaving the construction site when the removal of the materials is not appropriate.

The system may allow for the establishment of one or more geofenced delivery zone areas. These areas could be monitored and established with additional access restrictions to individuals to further prevent loss or damage of materials. The system can determine the area where the materials are stored to assist in insuring that the materials are received and stored in compliance with the warranty specifications for the materials.

The system may control access to power by individuals of the construction site. The system may provide several power outlets and may grant access to the power outlets as warranted. The use of power may be recorded by the system. Different levels of voltage may be provided as required. Parties using the power outlets may be billed appropriate amounts based upon the recorded power usage. The system can also restrict power usage during predetermined events including warranty confirmatory, safety situations and the like.

The system may also interface with the inspectors such that an inspector may enter notes and related details of an inspection. The system may allow the inspector to capture images of notes, forms, and the like using various solutions.

Exemplary embodiments may reference a record of a construction project on persistent storage. The process of maintaining the record for the construction project may begin by the development of a Building Information Model (BIM) that contains 3D plans for the construction with full details. Based on the BIM, a Bill of Materials (BOM) may be determined. The BOM may contain a complete itemization of materials needed for the construction project. The BOM includes information such as make, model, quantity, warranty information, hazardous material information or other safety details. The BOM may be updated as actual materials arrive to the site that includes serial numbers, bar codes, QR codes, RFID values or other component or product identifications.

Materials arriving to the site may be recorded, as well as the BIM and BOM, on the persistent storage.

The exemplary embodiments may receive or determine a construction schedule that contains full project details and sequencing, including the specification of dependencies. Smart contracts may be provided that use the persistent storage for each step or task of the construction schedule. This information and the schedule may be augmented with worker or employee lists for each task. The smart contracts may set forth acceptance or inspection requirements for confirmation of completion and payment.

The exemplary embodiments may confirm conditions at the construction site and may record/hash weather conditions at the time certain tasks are started, stopped, and/or marked as complete. The exemplary embodiments may record the weather conditions related to the materials on site.

The exemplary embodiments may build a complete record of plans, the actual "as built" including make, model, serial number or other identification of for every component in the home resulting from the construction project. The record may include a complete record of who completed the work, who inspected the work and how the project was insured and funded. This record may be updated as any property management adds information like maintenance requests, maintenance completions, utility usage, rental history, etc.

FIGS. 1A-1D illustrate an example of a system for an exemplary embodiment. In FIGS. 1A-1D, the system is implemented as a kiosk 100. The kiosk 100 may be located at a construction site. One suitable approach is to pour a concrete slab and then position a kiosk on the slab in a secured manner.

FIG. 1A shows a first side of the system kiosk 100. The kiosk 100 includes a camera 102 for obtaining images of individuals entering or leaving the construction site as well as images of individuals along a perimeter of the construction site. As will be explained in more detail below, the camera 102 may capture biometric images upon which biometric recognition may be performed. Multiple cameras may be placed on or around the kiosk 100. The cameras may have biometric recognition and motion detection capabilities. Kiosk 100 may include an addition to the camera 102 or instead of the camera 102, biometric-based identification devices that may be used to confirm the identity of individuals entering, leaving or on the perimeter of the construction site. The kiosk 100 may include an antenna 104 for communicating with a wireless network, such as a WiFi network, Bluetooth or a 4G/5G cellular network. The kiosk 100 may include a housing 103 made of suitable weather resistant material, appropriately sealed to protect the internal hardware. The kiosk 100 may include a display 106A, such as a touchscreen display, upon which information may be displayed and entered. The display 106A may include an integrated camera that may be used to capture images and that may be used in performing facial recognition of individuals. The display may also include or operatively associated with one or more integrated speakers for providing audio output, a microphone for receiving audio information to facilitate two-way communications to a remote location. The kiosk 100 may include a scanner 110A for scanning items, such as deliveries, as will be explained in more detail below. The scanner 110a may be, for example, a QR scanner, an Optical Character Recognition (OCR) or a bar code scanner 110A in some instances. The side of the kiosk 100 shown in FIG. 1A is intended to be used for deliveries and inspections. A delivery person may scan delivered items via the scanner 110A and may interface with the kiosk using the touch screen display 106A, as will be described below. An inspector may scan or take images of inspection documents via the scanner 110A or camera and may interface with the kiosk using the touch screen display 106A, as will be described below. In some alternative embodiments, there may be fewer sides in which to interact with the kiosk for all authorized personnel. An overhang 112 may be provided to assist in decreasing glare and protecting some of the items on the kiosk from the weather.

FIG. 1B depicts a side of the kiosk 100. This side also includes a touch screen display 106B as well as a scanner 110B. Display 106B may include or be operatively associated with an integrated camera for capturing images, speakers for providing audio output and a microphone to facilitate two-way communications with a remote location. Still further, this side of the kiosk 100 may include data ports 108B. This side of the kiosk is intended for use by contractors (e.g. workers and other construction related personnel). The kiosk 100 may be accessed to gain access to equipment, tools and to sign in or sign out when leaving or entering the construction site, as will be described below.

FIG. 1C shows a third side of the kiosk 100. This side has a location 116 in which permits may be displayed. In some alternative embodiments, the permits may assume electronic form so that a video display is provided in the area 116 of the kiosk 100. The tax map submap (TMS) number 120 for the construction site location may be displayed on the kiosk 100. In addition, the site address 118 may be displayed on the kiosk 100. The site address may refer to both the mailing address for the construction site and/or the GPS location.

FIG. 1D shows the final side of the kiosk 100. An access panel 122 may be provided to access a breaker box for the kiosk 100. An additional access panel 124 may also be provided to access internal components of the kiosk 100. Still further, access panel 126 may be provided to gain access to power plugs for providing power at the construction site. The access panel 126 may be under programmatic control in some instances to regulate access to the power plugs. If access is granted, the panel is unlocked, whereas if access is denied, the access panel 126 is locked. In some embodiments, access to the power supply may be controlled by controlling the flow of power to the power plugs under programmatic control. These control mechanisms may be used separately or in conjunction.

FIG. 1E depicts components that may be found in the site supervisor of exemplary embodiments even when not housed in a kiosk. The site supervisor may include a computing device 132. The computing device 132 may take many different forms indicating a desktop computing device, a laptop computing device, a mobile computing device, an embedded system, a smartphone or the like. A display 134 may be integrated with the computing device 132 or as a separate device, such as a liquid crystal display (LCD) device, a light emitting diode (LED) display device or other types of display devices on which computer information may be displayed. One or more biometric-based identification devices 136 may be provided. As will be explained in more detail below, multiple biometric-based identification devices may be used. Network interfaces and a modem 138 may be provided. The network interfaces may interface the computing device 132 with a local area network or a wide area network. The network may be wired or wireless. A modem may be provided in order to communicate telephonically or over cable lines with remote computing devices.

The system 130 may be implemented in a distributed fashion and may include an alternative energy source 140. For example, solar panels, wind turbine(s), a battery or the like may be used. In a kiosk implementation, the alternative energy source may be physically affixed to the kiosk. For example, solar panels or a cable to a wind power source could be affixed to the kiosk. Alternatively, a power line leading to the alternative energy source may be connected to the kiosk to provide power for the kiosk.

The system 130 may include various scanners and readers 142, such as those described above relative to kiosk. The system 130 may include a utility supply and control 144 and a mechanism for turning the utilities, such as power, gas and/or water, on and off under a programmatic control. The system 130 may include an internet data supply control 145 and a mechanism for turning the access to this service on and off under a programmatic control. Programmatic control may be provided to grant or deny access to such resources. The system 130 may include an antenna 146 for wireless communications signals to receive and transmit. The system 130 may include a gyroscope 148 to monitor any moving of the system. The gyroscope 148 may indicate motion indicative of whether someone is trying to move or tilt the kiosk. Logic may be provided to send a notification in such an event where the gyroscope indicates substantial enough movement. The system 130 may include a weather station 150 to measure current weather conditions, such as temperature, air movement, humidity, precipitation, barometric pressure, direct sunlight, and the like. Input from the weather station 150 may be used to inform decision making by the system in some instances. Alternatively, the weather may be collected via software, such as from a weather service or other weather source. Similarly, the system 130 may include a weather sensor 141. The sensor can be a wet bulb globe temperature adapted to measure, among other things, heat stress in direct sunlight, which accounts for temperature, humidity, air movement (direction and speed), sun angle and cloud cover (solar radiation).

Figure 2A:
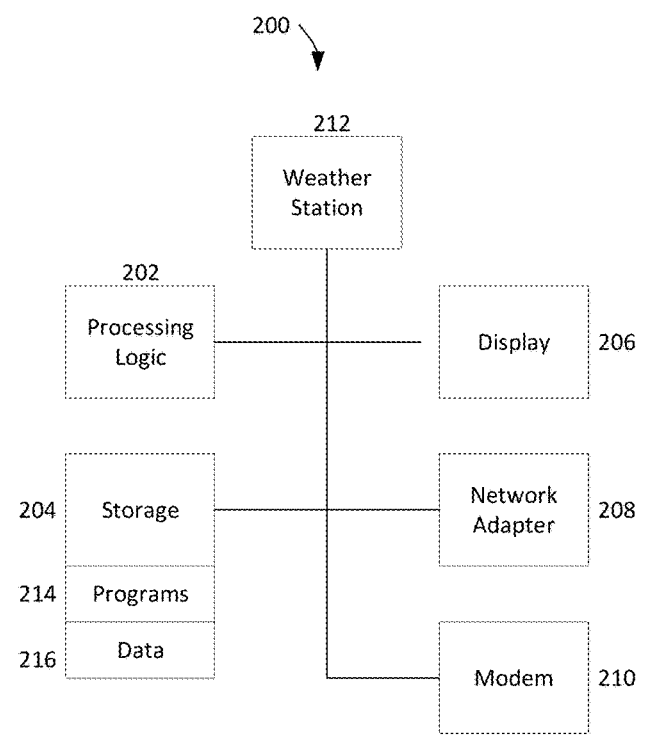
FIG. 2A depicts a block diagram of aspects of the system.

FIG. 2A shows an example of a computing device 200 for the system. The computing system may include processing logic 202, such as microprocessors, controllers, field programmable gate arrays (FPGA), application specific integrated circuits (ASICs) electronic circuitry, and other types of logic. The processing logic 202 performs the operations of the computing device 132. A storage device 204 may also be provided. Storage capability Storage device 204 may take various forms, including magnetic storage, optical storage, etc. Storage capability 204 may include computer-readable media, including removable computer readable media, such as disks, thumb drives and the like, or disk drives, solid state memory, random access memory (RAM), read only memory (ROM) and other types of storage. The computing device may include a display 206, such as an LCD display, an LED display or other types of display devices on which video information may be displayed. The computing device 200 may include a network adapter 208 for interfacing with networks and a modem 210 for communicating wirelessly, over telephone lines or cable lines with remote devices. The processing logic 202 may use information stored in the storage device 204. In particular, the processing logic 202 may execute programs 214 stored in the storage and may access and store data 216 relative to the storage device 204. The computational functionality of the system described herein may be realized by the processing logic 202 executing the programs 214.

Figure 2B:
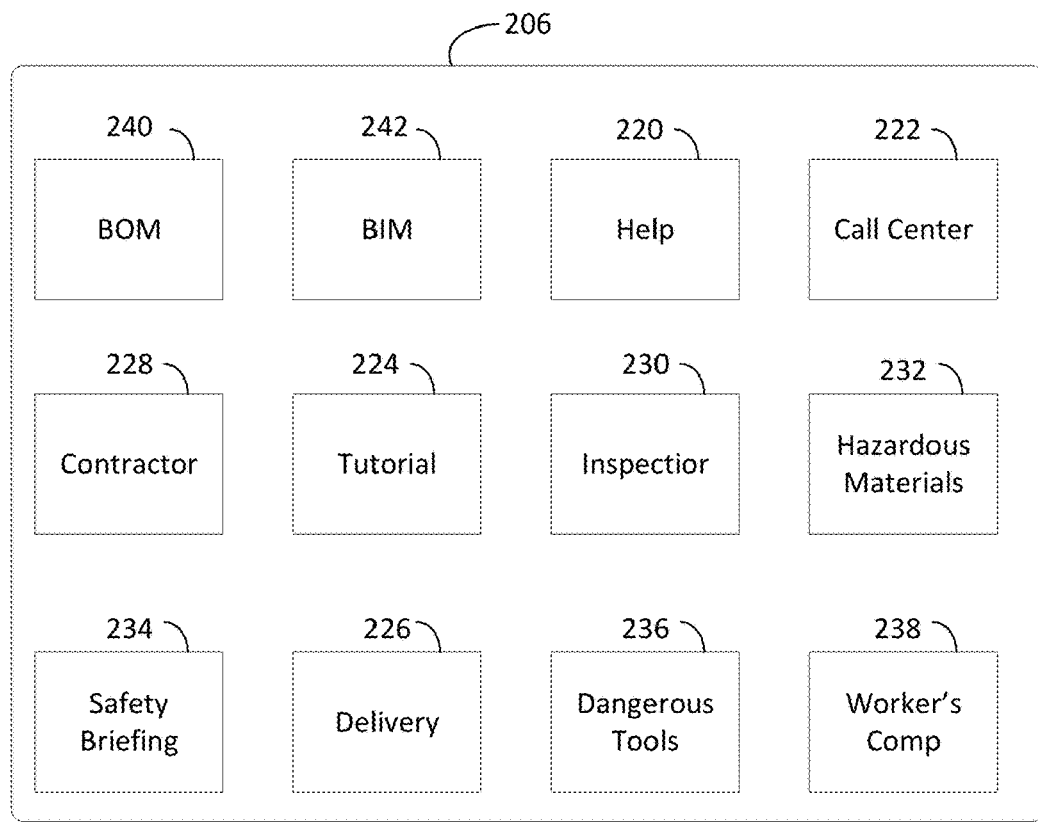
FIG. 2B depicts an illustrative aspects of a user interface.

FIG. 2B shows an example of a user interface on display 206, such as found in the kiosk 100. The user interface may include activatable elements. A user may depress these activatable elements or select these activatable elements using an input device, such as a mouse, keyboard, touchscreen or the like, to activate the components. The display 206 may include a help element 220 that may be activated to obtain help information regarding use of the kiosk. It may also contain real time construction plans. It may also include "how to" assistance including videos related to the various processes and tasks performed on the specific site. The user interface on the display 206 may also include a call center activatable element 222. Selection of the call center activatable element 222 may cause a call to be initiated with a call center so that the individual using the kiosk 100 may have a telephone and or video conference with personnel at the call center. The user interface on display 206 may also include a tutorial activatable element 224. Selection of the tutorial activatable element 224 causes a tutorial to be displayed to teach the individual about operation of the kiosk.

Figure 2C:
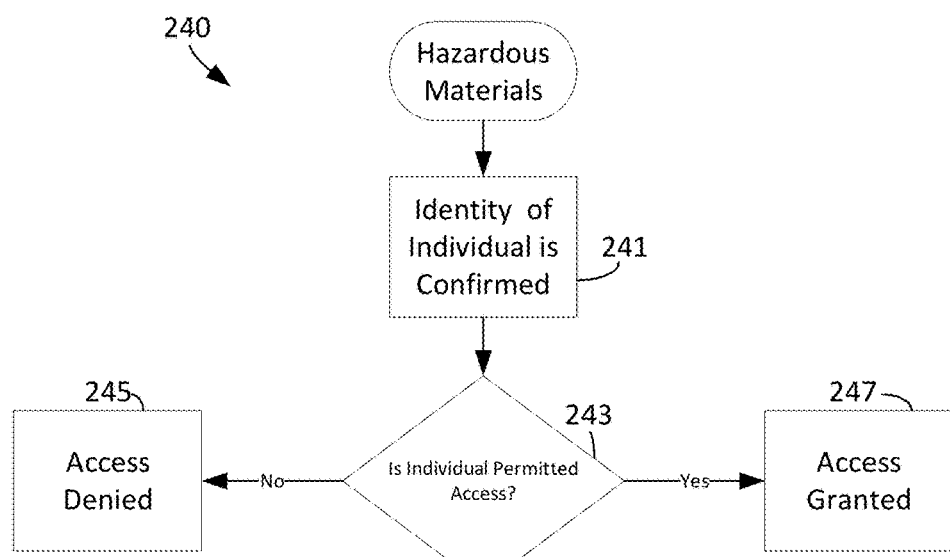
FIG. 2C depicts a flowchart of aspects of the system.

A list of hazardous materials at the site may be activated by activating element 232. This list is updated as hazardous materials are delivered, removed or consumed. Access to hazardous materials may also be controlled via the system 130. FIG. 2C shows a flowchart 240 of steps that may be taken to control access to hazardous materials at the construction site. First, the identity of the individual is confirmed 241, such as described above using biometric identity verification. The permissions information is accessed to determine if the individual is to be granted access to the hazardous materials 243. If the permissions indicate that access is to be granted, access is granted 247. In contrast if the permissions indicate that access is not to be granted, then access is denied 245.

The user interface on display 206 (FIG. 2B) may also include a safety briefing activatable element 234. Activation of this element 234 results in a safety briefing being displayed on the display 206. The user interface on display 206 may include a dangerous tool activatable element 236. Activation of this element 236 causes the display of a list of dangerous tools on the construction site. An individual must have the proper authorization or certification to use such dangerous tools. The authorization or certification may be stored with the permissions.

Figure 2D:
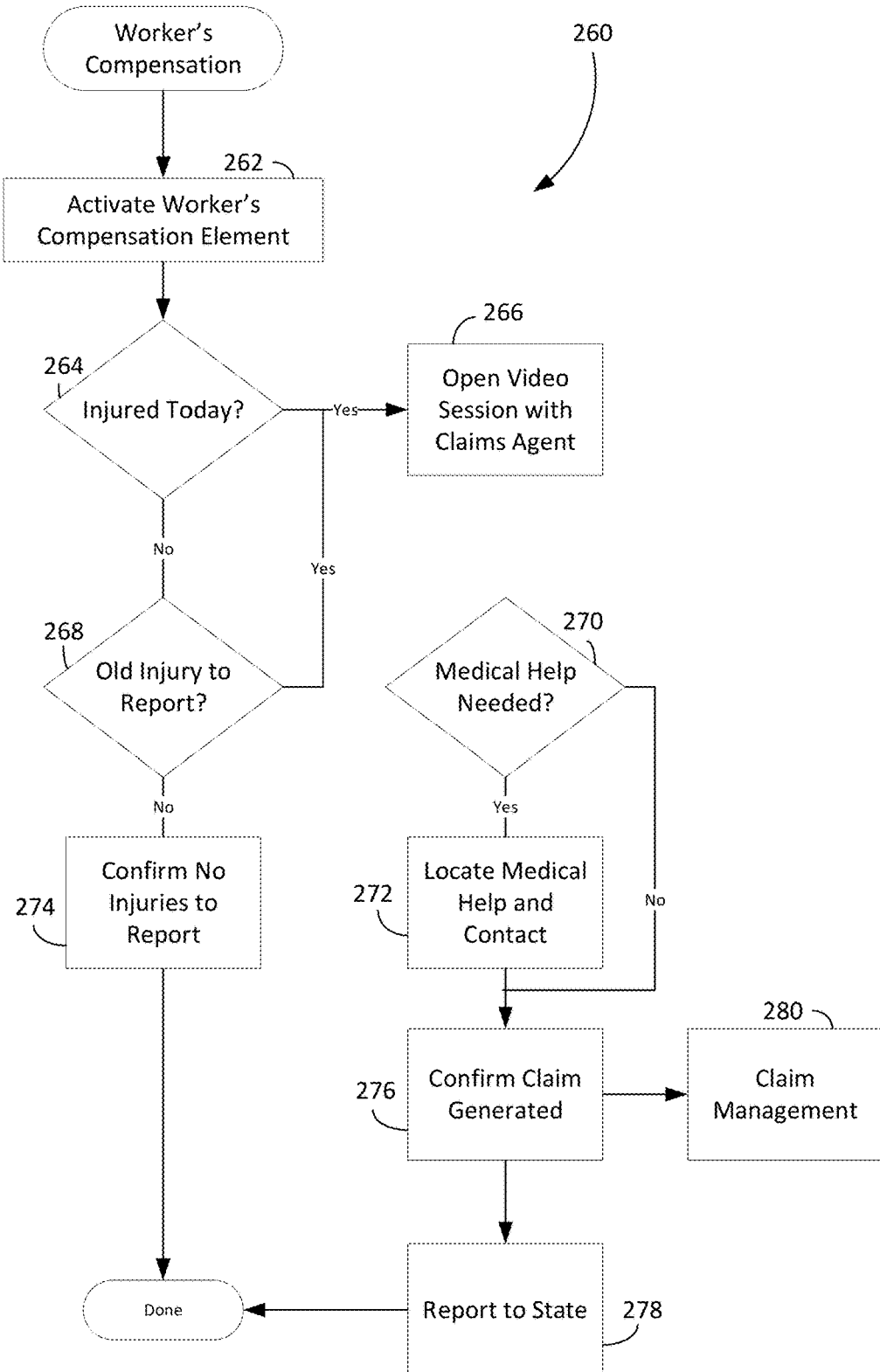
FIG. 2D depicts a flowchart of aspects of the system.

The system 130 may include coding software which allows each tool to be assigned to authorized personnel. Utilizing this coding along with smart locks as previously mentioned, the system 130 either unlocks or prevents access. Selection of the worker's compensation activation element 238 may be required at the end of each workday or when an injury occurs. FIG. 2D provides a flowchart 260 of steps taken when the element 238 is activated 262. All workers may be required to enter this information each day. If the individual indicates that he/she has been injured 264, a video session with a claim agent is initiated 266. The claim agent may gather information to initiate any claim processing. The claim agent may determine if medical help is warranted 270. If medical help is warranted, the location of appropriate medical help is identified based on a location of the construction site (based on proximity and type of injury) and contact is made with the medical help (e.g., calling of an ambulance, hospital or urgent care facility) 272. The facilities may be chosen to be "in network" for the worker's compensation carrier. A confirmation of the claims may be generated 276 and sent to claims management 280. In addition, a report may be sent to the appropriate state authority 280. The steps 266, 270 and 272 may also be performed in the instance in which the individual has an older injury to report 268. Where there is no injury to the individual, the lack of injury is reported 274.

Delivery personnel may activate the delivery activatable element 226 (FIG. 2B). This causes a delivery functionality to be displayed where delivery notes may be added and where information may be gathered from the delivery person regarding a particular delivery. A contractor activatable element 228 may be selected by contractor individuals. Selection of this activatable element 228 causes the activation of the contractor functionality whereby the contractor may sign in, request tools, equipment, power or materials, leave notes or the like. Lastly, an inspector activatable element 230, may be activated to cause the inspector functionality to be activated. The inspector functionality may enable an inspector to add inspection notes, provide electronic inspection certificates and the like. The system can provide reports that can be automatically generated from the existing data described herein as well as notes manually added during the construction process. The reports can be generated at predetermined times such as daily or upon completion of specific tasks.

Figure 3A:
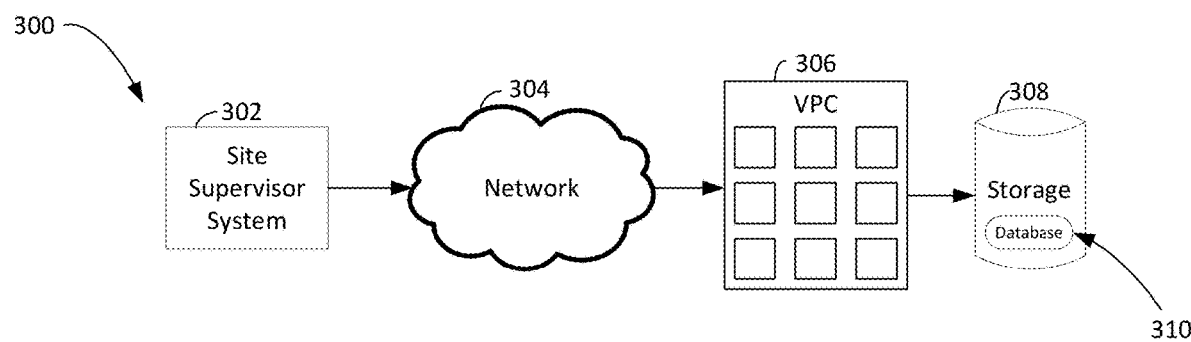
FIG. 3A depicts an example of a distributed communications environment.

As shown in FIG. 3A, the exemplary embodiments may be implemented in a decentralized computing environment 300, that may include distributed systems and cloud computing. FIG. 3A shows one or more systems 302 that may be in communication with a remote cluster 306 via a network 304. The cluster 306 may store information received from the system 302 and provide added computational functionality. The network may be a wired network or a wireless network or a combination thereof. The network 304 may be a secure internet connection extending between the system 302 and the cluster 306, such as a virtual private cloud (VPC). The server may be a computing device and can be in communications with the site computer device. The cluster 306 may include access to storage 308. The storage 308 may include a database 310 in which information regarding a construction site is stored in a consistent manner.

Figure 3B:
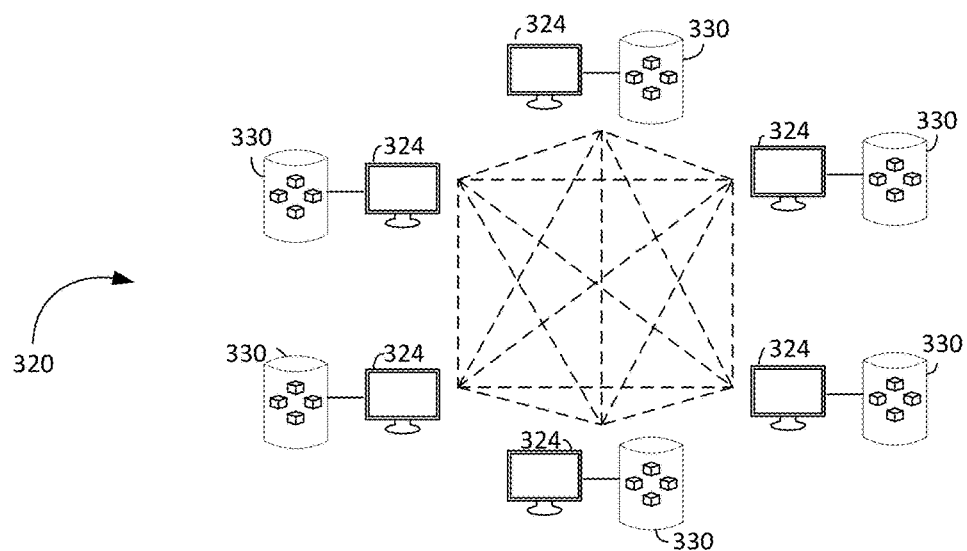
FIG. 3B depicts an example of a distributed ledger.

FIG. 3B shows diagram 320 of an example of a peer-based network where a distributed ledger 330 is broadcast and shared among the nodes 324. This network may be resident in the VPC cluster 306 (FIG. 3A) or in the network 304 for example. The nodes 334 may represent computing resources, such as server computer systems or other computing systems, resident at the parties identified in FIG. 27, for example. Each node that has access to a copy of the persistent storage 330.

Figure 3C:
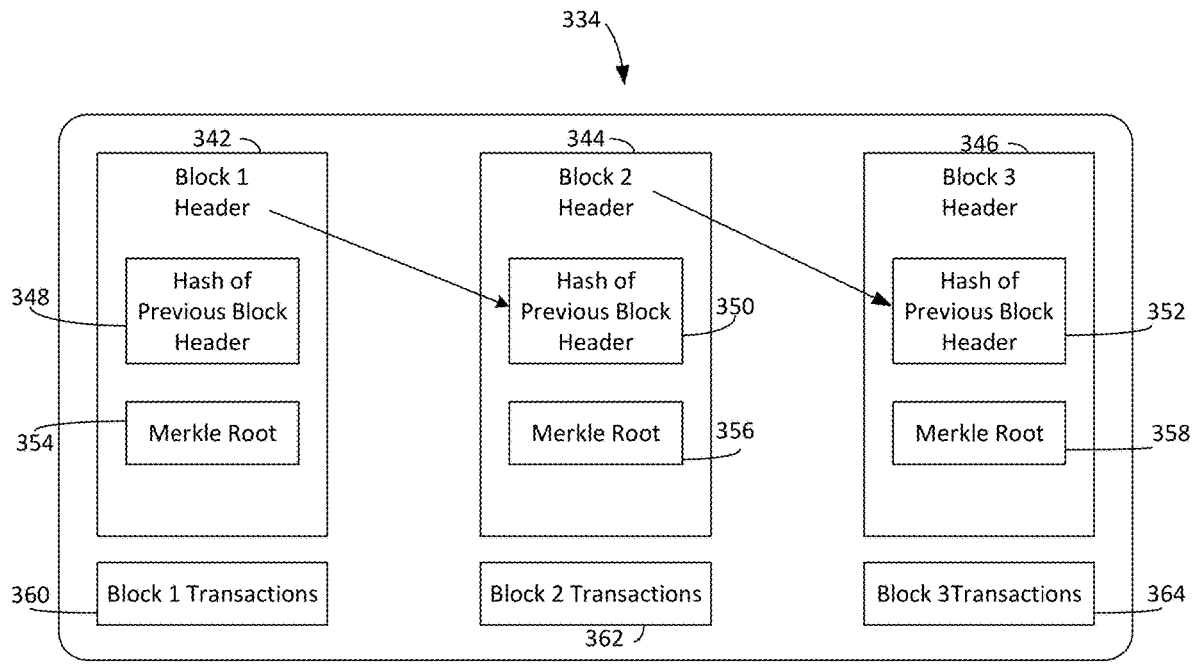
FIG. 3C depicts a simplified view of aspects of an immutable ledger.
Figure 3D:
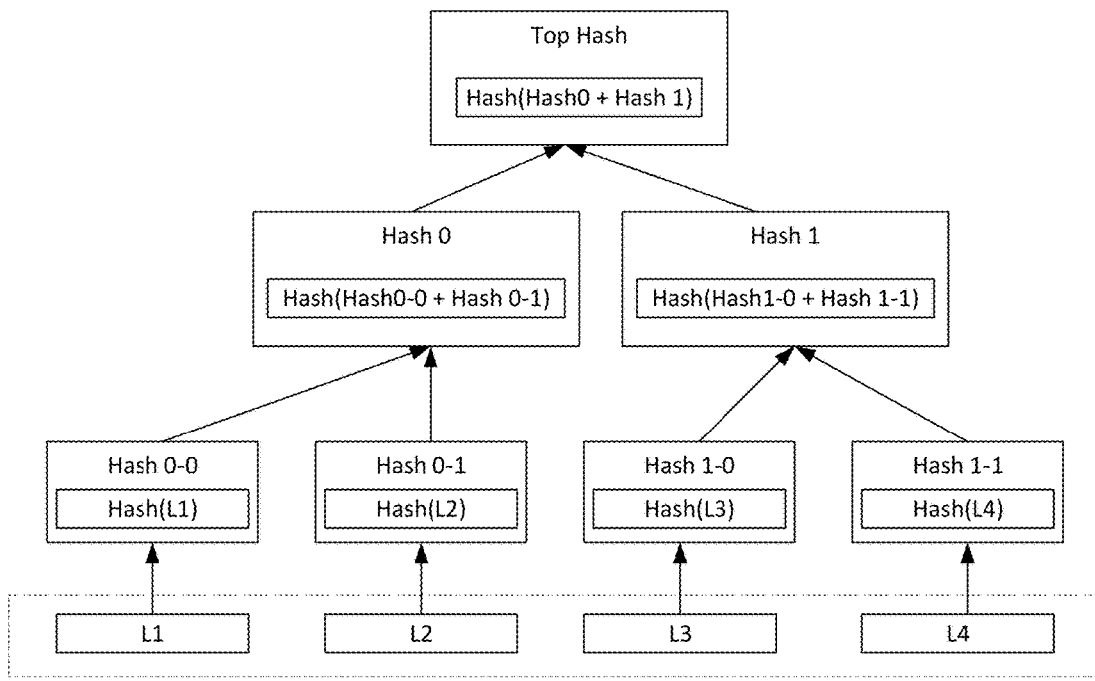
FIG. 3D depicts an example of a Merkle Tree.

FIG. 3C shows an example of a simplified persistent storage 334, for example, blockchain or immutable distributed ledger. In the case of block chain 334, it is formed by interlinked blocks (i.e., Block 1, Block 2 and Block 3). Each header holds a hash of previous block header 348, 350 and 352 that acts as interlinking pointers between the block. The header may also include a reference 354, 356 and 358, such as a hash, to a root of a Merkle Tree. Data for transactions 360, 362 and 364 may be referenced via the respective Merkle Tree. FIG. 3D shows an example Merkle tree, having nodes holding hash values. Each non-leaf node is a hash of its child nodes, while the leaf nodes hold data blocks. The structure of the tree allows for efficient mapping of arbitrarily large amounts of data and enables easy identification of where changes in that data occur.

Figure 3E:
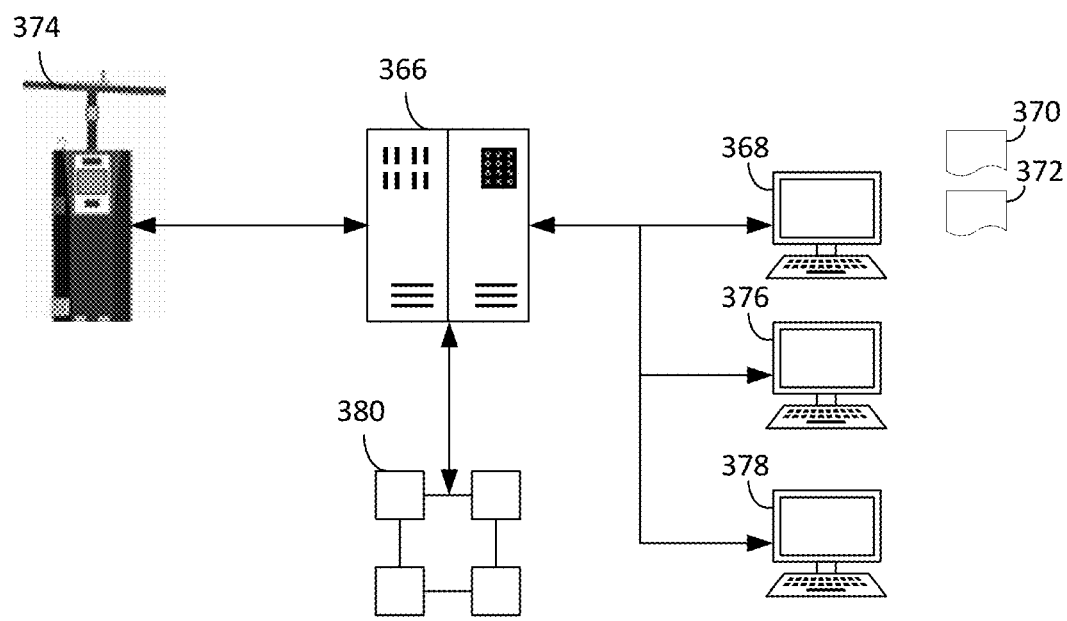
FIG. 3E depicts a schematic of the aspects of the system.

Referring to FIG. 3E the server 366 can be in communications with design computing device 368 that can be used to transmit an architectural design 370 and bill of materials 372 to the server and site computer device 374. Building material manufacturing specifications can be receive from a supply computer device 376 and regulatory code can be received from a regulatory computer device 378.

The various computer devices, including the server and site computer device, can be in communications with persistent storage 380. The communications between the various computer device, including the server and the site computer device and immutable distributed ledger can be a global communications network, wide area network, local area network, deliver to a computer readable medium from one device to another (e.g. USB drive, CD, DVD) and can be wired or wireless.

The server can include a set of server computer readable instructions that can a set of server computer readable instructions stored on the server computer readable medium that, when executed by a processer included in the server, can be configured to: receive a building information model from a design computing device in communications with the server including an architectural design in compliance with regulatory code associated with a construction site and a bill of materials representing a set of materials to be used at the construction site according to the architectural design and a building material manufacturing specifications, store the building information model on the immutable distributed ledger, transmit to the bill of material to a supply computer device informing a third-party supplier to deliver the materials to the construction site, receive a material delivery information representing that the set of materials to be used at the construction site has been physically delivered to the construction site, receive material installation information representing that the set of materials at the construction site has been installed at the construction site in compliance with a regulatory code and the building material manufacturing specifications, receive an internal inspection information from a site computer device in communications with the server representing that the installation of the set of material is in compliance with at least one of the architectural design, the bill of materials, the regulatory code and the manufacturing specifications, transmit an external inspection information request to an external inspection computer device in communications with the server; receive an external inspection information from a site computer device representing that the installation of a set of material as installed is in compliance with at least one of the architectural design, the bill of materials, the regulatory code and the manufacturing specifications, transmit the external inspection information confirmation to an external inspection computer device in communications with the server; debit a first account associated with the construction site and credit a second account associated with an external inspector, create a certification of code compliance according to the building information model, the material delivery information, the material delivery information, the internal inspection report and the external inspection report, and, store the certification of code compliance on the immutable distributed ledger.

The site computer device can be physically associated with the construction site and includes a site computer readable medium and site input interface. A set of site computer readable instructions that, when executed by a site processor included in the site computer device, can be configured to: receive the bill of materials from the server, receive the material delivery information from the site input interface at the construction site, receive the material installation information from the site input interface at the construction site, receive the internal inspection information from a first inspector, receive the external inspection information from a second inspector, and, transmit the material delivery information, the material installation information, the internal inspection information and the external inspection information to the server.

The set of server computer readable instructions can be configured to store the bill of materials on the immutable distributed ledger; and, the supply computer device can be configured to retrieve the bill of materials from the immutable distributed ledger. The site computer device can be in communications with the immutable distributed ledger; and, the set of site computer readable instructions can be configured to store the material delivery information, the material installation information, the internal inspection information and the external inspection information on the immutable distributed ledger. A reader can be in communications with the site computer device and configured to receive information from a tracking device; and, the set of site computer readable instructions can be configured to receive material delivery information from the tracking device associated with the set of materials. The reader can be selected from the group consisting of: radio frequency identification (RFID) detector, ultra-high frequency (UHF) detector, a bar code scanner, a QR code scanner, near frequency communication (NFC) device; an optical character recognition (OCR) device and any combination thereof. A environmental sensor, such as a weather sensor or weather station, can be in communications with the site computer device configured to record the weather at the construction site, the set of site computer readable instructions can be configured to capture a installation weather at the construction site at a time that the set of materials is installed at the construction site and associate installation weather with the installation of the set of materials and transmit the installation weather to the server, and, the set of server computer readable instructions can be configured to create the certification of code compliance according to the installation weather being in compliance with the manufacturing specifications for the installed material. The construction site can be associated with or identified by a physical location information such as global position (e.g. GPS) information.

The set of site computer readable instructions can be configured to compare the bill of materials with the material delivery information and determine any material discrepancies, generate a material discrepancy notification according to any material discrepancies and transmit the material discrepancy notification to a third party. The site computer device is carried by a movable platform including a cart, pallet, vehicle, trailer and the like.

Figure 4:
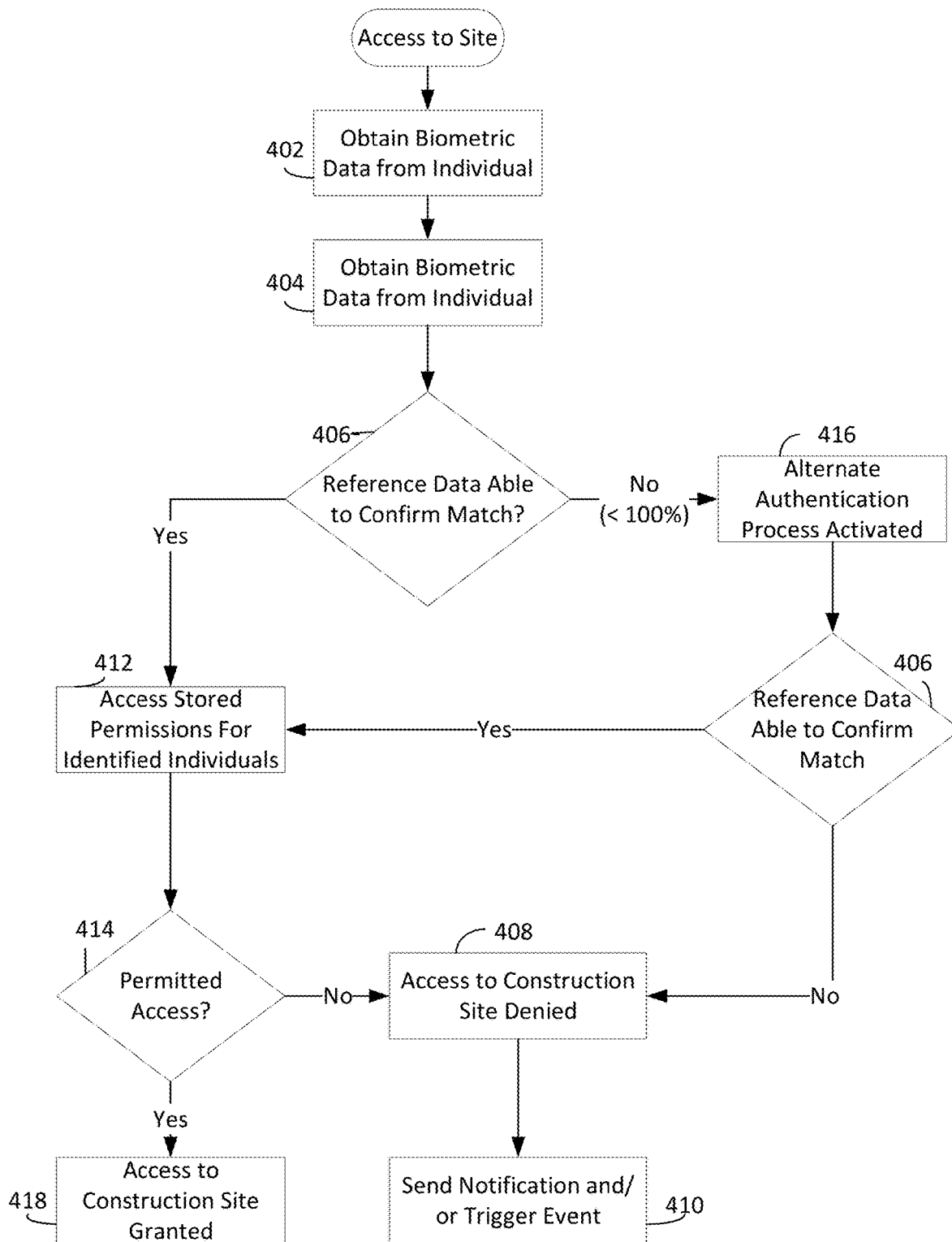
FIG. 4 depicts a flowchart illustrating aspects of the system.

The system can control access to the construction site. FIG. 4 shows a flowchart 400 identifying steps that may be performed in exemplary embodiments regarding this functionality of the system. Initially, biometric data is obtained from an individual that is seeking access to the site 402. As was discussed relative to the example of FIG. 1A in some exemplary embodiments, a camera 102 may capture an image of an individual and facial recognition may be performed. The biometric data in this case is the facial image of the individual. In other exemplary embodiments, the biometric data may be, for example, fingerprint data, hand scan data, voice print data, retinal scan data or the like, gathered by appropriate biometric-based identification devices. The obtained biometric data is stored, and then previously stored data is accessed from storage to compare biometric data for known individuals and to attempt to identify the individual 404. A comparison may be made between the gathered biometric data and the known biometric data to determine if there is sufficient closeness for there to be a match. Information regarding the identity of the individuals for which the biometric data is stored is also stored in the storage device. A determination is then made whether there is a match or not 406.

If there is not a match 406, a manual process may be executed, or an alternative authentication process may be deployed 416. If this alternative authentication fails to produce a match 406, access to the construction site may be denied 408. In addition, a notification may be sent to a responsible party and/or an event may be triggered, such as contacting security or law enforcement officials 410. If the alternative authentication process produces a match, the process proceeds to 412.

The system may store permissions for each individual. These permissions may identify the dates and times where the individual is given access to the construction site. In addition, the permissions may specify what tools, equipment or materials the individual is allowed to access. The permissions may specify whether the individual is allowed to use a power supply and may specify what portions of the construction site the individual is permitted to access. These permissions may be accessed to determine the permissions for the identified individual 412. If the permissions indicate that access is permitted 414, the individual may be granted access to the construction site 418.

Figure 5:
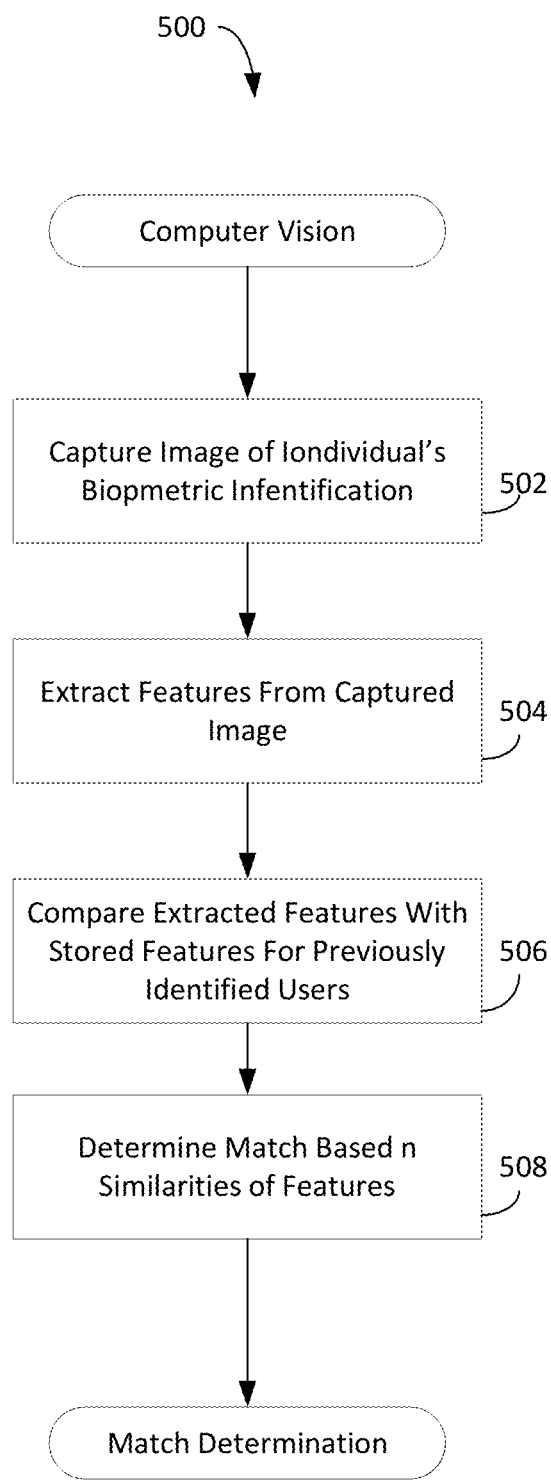
FIG. 5 depicts a flowchart illustrating aspects of the system.

FIG. 5 shows steps that are performed in a case of computer vision for 402, 404 and 406 of FIG. 4. The flowchart 500, regarding computer vision, begins with 502 in which an image of an individual is captured for biometric recognition. This may be captured by a number of different types of image capture devices, including an intermittent video camera or other type of camera. In the case where an image of the face of an individual is captured, identifying features may be extracted from the captured image 504. In other words, unique facial features that help to identify an individual are extracted from the image. The image may be filtered and/or normalized. The features are then compared with the stored features for identified individuals 506, determination is made whether there is enough similarity for there to be a match.

FIG. 6 shows a diagram 600 that illustrates various types of biometric data 602 that may be obtained by biometric-based identification devices at the construction site to attempt to identify individuals. Biometric data may include facial recognition 603, an iris/retinal scan 604, a fingerprint scan 608, a hand scan 608, a voice print 610 or heart rate signature 614. It should be noted that other types 612 of biometric data may also be used in exemplary embodiments to help identify individuals uniquely. Also, an individual may be required to provide multiple types of biometric data in some instances.

As was mentioned above, when individuals attempt to access the construction site and is not granted access, certain events may be triggered (see 410 in FIG. 4). FIG. 7 shows a diagram 700 that provides an example of different types of triggered events 702. One type of triggered event is an alarm 704. This alarm may include visual alerts, audio alerts or a combination thereof. The alarm may be a silent alarm to individuals. Another event that may be triggered is to send notifications to a supervisor for the construction site 706. The supervisor may, for example, receive an email, a text, phone call or other notification that someone is trying to access the site that is not permitted. A triggered event 702 may also include the contacting of law enforcement or a member of a security service indicating that an unauthorized party has tried to access the construction site. Lastly, a triggered event 702 may include prompting the individual to produce proper identifying information to an official at the site or to a scanning device at the kiosk 100.

Figures 8, 9:
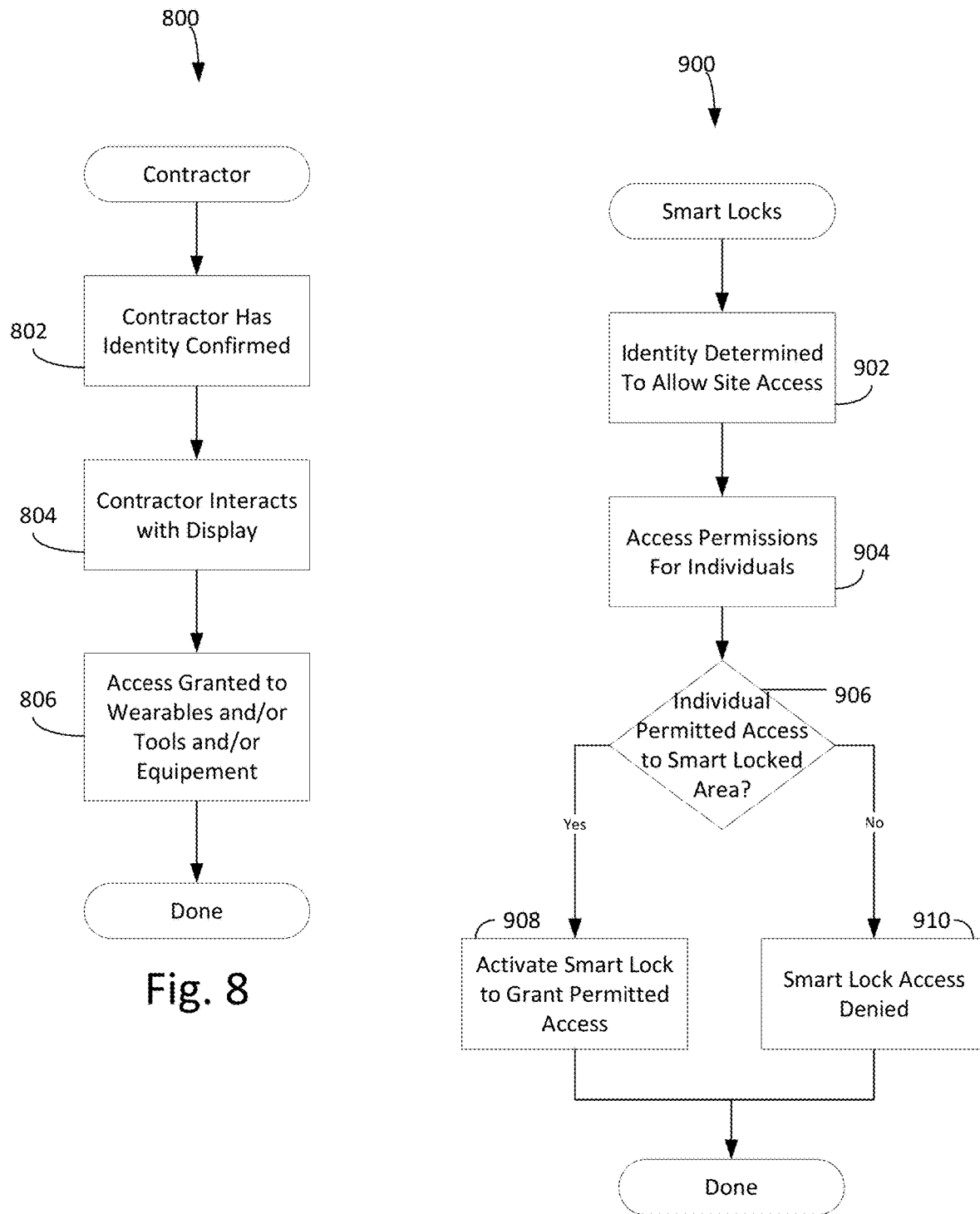
FIG. 8 depicts a flowchart illustrating aspects of the system.
FIG. 9 depicts a flowchart illustrating aspects of the system.

One type of individual is a contractor. FIG. 8 shows a flowchart of the steps that may be performed to ensure that the contractors gain access to the appropriate items once they have been granted access to the construction site. As shown in the flowchart 800 of FIG. 8, initially the contractor has their identity confirmed, as has been discussed above 802. The system may offer an alternative touchscreen option to place a call to the appropriate party should the software fail to verify an otherwise authorized individual. The contractor may be prompted to interact with the display, such as the touchscreen 106B (FIG. 1) to register and to indicate whether they seek certain items. For example, with the user interface of FIG. 2B, the contractor may activate the contractor activatable element 228. Access is then granted to wearables and/or tools and/or equipment 806. The wearables, the tools and/or equipment may be stored in sheds or in other secured locations under the control of smart locks that may be controlled by the computing system of the system.

FIG. 9 provides a flowchart 900 of the steps that may be performed relative to smart locks at the construction site. The individual, such as a contractor, has his/her identity determined and has access to the construction site 902. The system may offer an alternative touchscreen option to place a call to the appropriate party should the software fail to verify an otherwise authorized individual. The permissions stored for the individual are accessed 904. A determination is made whether the individual is granted access to a smart locked area 906. If the individual has permission to access the area 908, the smart locks may be activated to unlock the area, such as where wearables, tools or equipment are located. Before the individual can use the tools/equipment, the individual may first be required to wear some of the wearables and to scan the tools or equipment to indicate that they will be using the tools or equipment. If the individual lacks the proper permissions to access the area, then access to the area is denied 910, such as by keeping the smart locks locked.

Figures 10, 11:
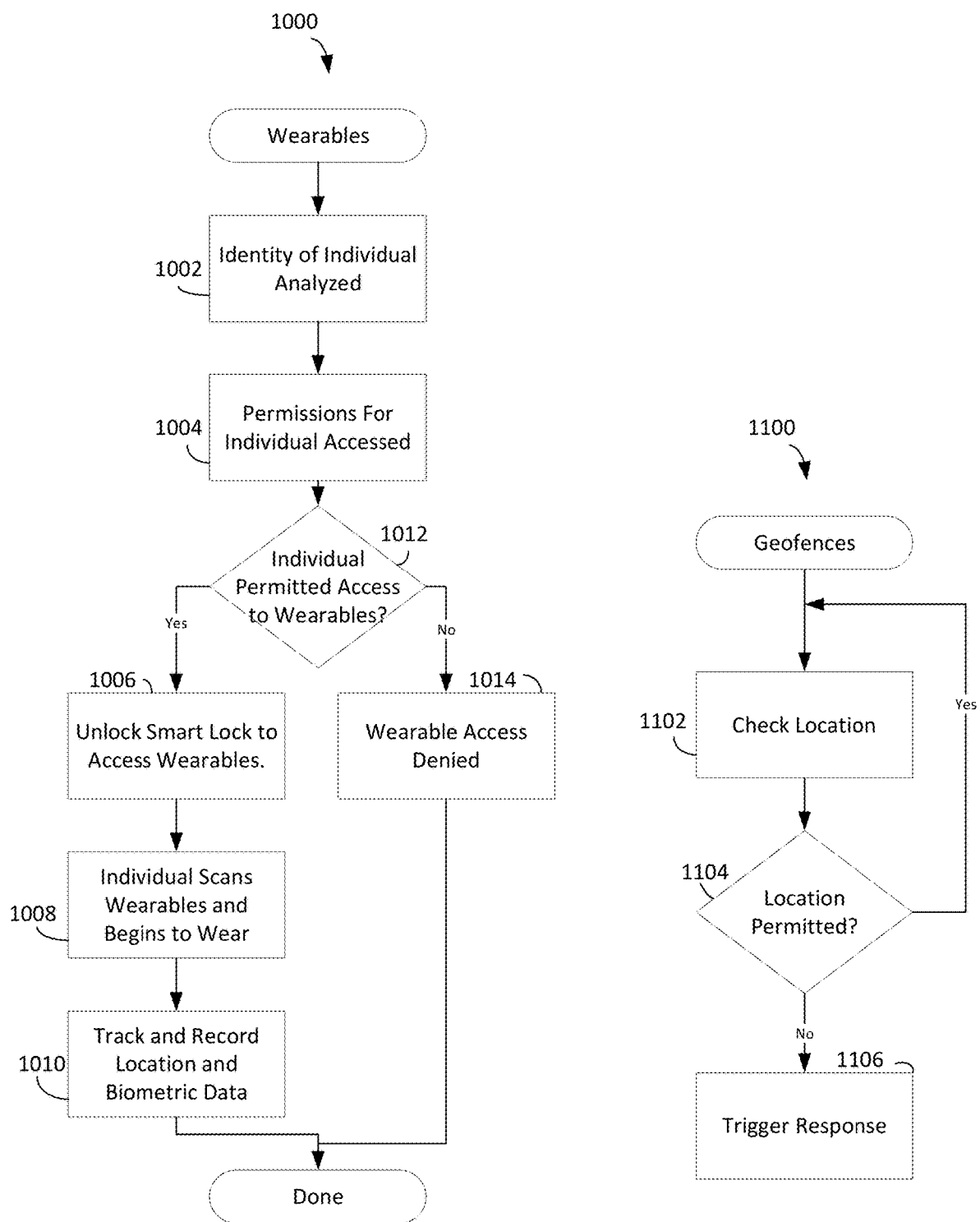
FIG. 10 depicts a flowchart illustrating aspects of the system.
FIG. 11 depicts a flowchart illustrating aspects of the system.

FIG. 10 contains a flowchart 1000 illustrating the steps that may be performed to obtain the wearables. For some individuals, a wearable can be provided to the individual prior to interaction with the system and used to register with the system. This individual can receive the wearable and upon approaching a kiosk, be registered with the system when the individual reaches a certain proximity to the system.

The wearables may include safety gear, such as hard hats, gloves, goggles, vests and the like, as well as wearables for tracking and obtaining biometric data. The identity of the individual is confirmed 1002, and the permissions for the individual are accessed 1004 and a determination is made based on the permissions if the individual should be granted access to the wearables 1012. The system may offer an alternative touchscreen option to place a call to the appropriate party should the software fail to verify an otherwise authorized individual. If it is determined that the individual should be granted access, the smart lock for the storage location of the wearables is unlocked 1006. The individual may then be prompted to scan information regarding the wearables so as to register the wearables and associate the wearables with the individual 1008. In one embodiment, the system may use one or more images of an individual to determine if the individual has the necessary safety equipment. For example, an image of the individual taken by the kiosk can be used to determine if the individual is wearing a hardhat and generate a warning if no hardhat is present.

The system may require that an individual wear certain safety equipment in the form of wearables. The system may record what wearable the individual scans. The system tracks and records the location and biometric data gathered by the wearables 1010. The wearables may include smart vests, bracelets, badges, sensors and the like that provide location information and biometric data, such as heart rate, body temperature, blood pressure breathing rate, gyroscopic informatic and/or other information. These wearables assist the system in tracking the location of individuals of the construction site. These wearables also help to track the biometric data of individuals. The biometric data may be helpful in identifying that an individual is experiencing an accident, a health event or is idle. The biometric data is stored so that a record of the biometric data can be kept. If in 1005, it is determined based on the permissions that the individual should not be granted access, then access to the wearables is denied 1014.

The use of the wearable to track location helps to facilitate geofencing in exemplary embodiments. The geofencing enables the system to track and limit access to locations of individuals at the construction site. The construction site may be partitioned into areas where different permission rights are given for the various areas. For example, a plumber may be given access to the kitchen and the bathrooms of a project under construction but may be prohibited from being in the living room or the roof. As shown in FIG. 11, a flowchart 1100 shows some of the steps performed automatically and can be performed without notification to an individual. The process begins with the checking of the location 1102 of an individual. A determination is made in 1104 whether the individual is permitted to be at that location. If the individual is not permitted to be at that location, a response is triggered 1106.

Figure 12A:
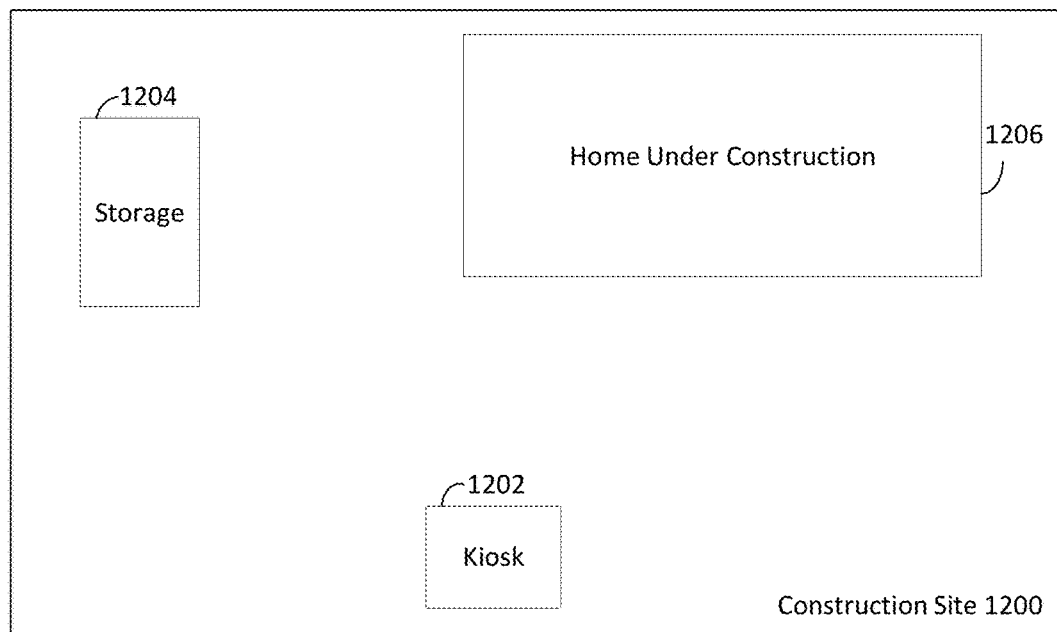
FIG. 12A shows a plan view of a construction site.

To help illustrate an example of geofencing, FIG. 12A shows an illustrative construction site 1200. The construction site 1200 may include a kiosk 1202 for the system as well as storage location 1204 that can be a building, trailer, shed or the like. The storage location 1204 may hold tools, equipment, wearables and/or materials. The construction site 1200 may also include a home or other building project that is under construction 1206.

Figure 12B:
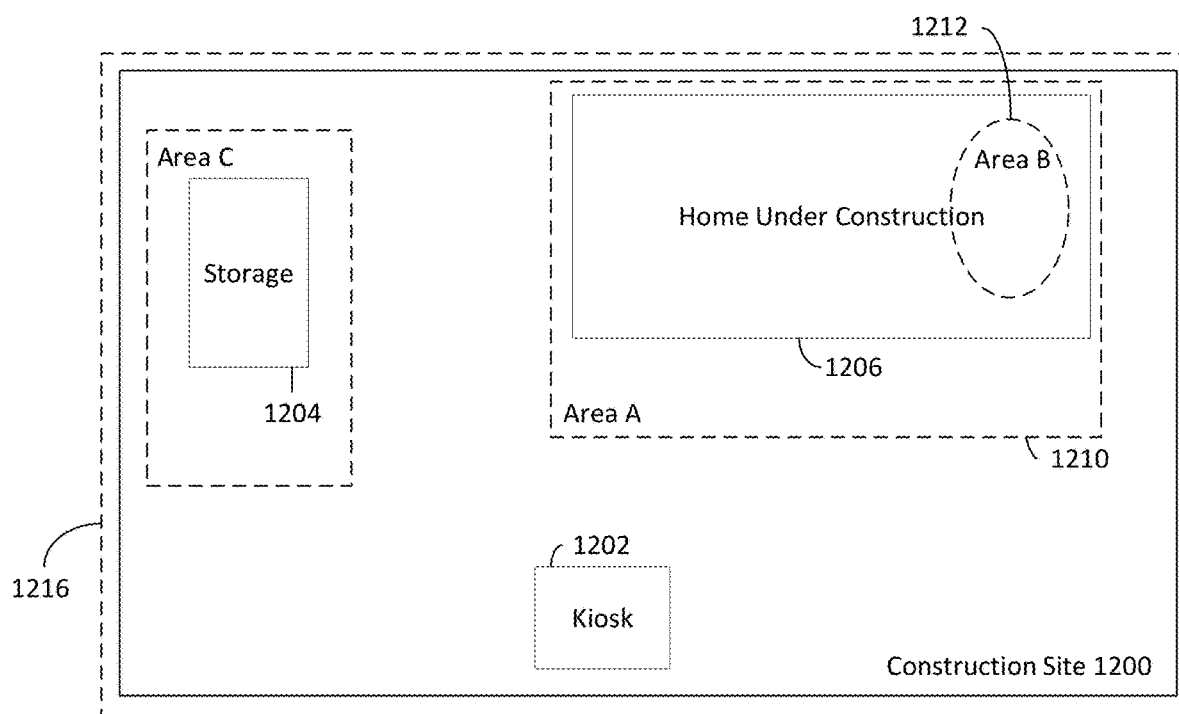
FIG. 12B illustrates geofencing areas at a construction site.
Figure 13:
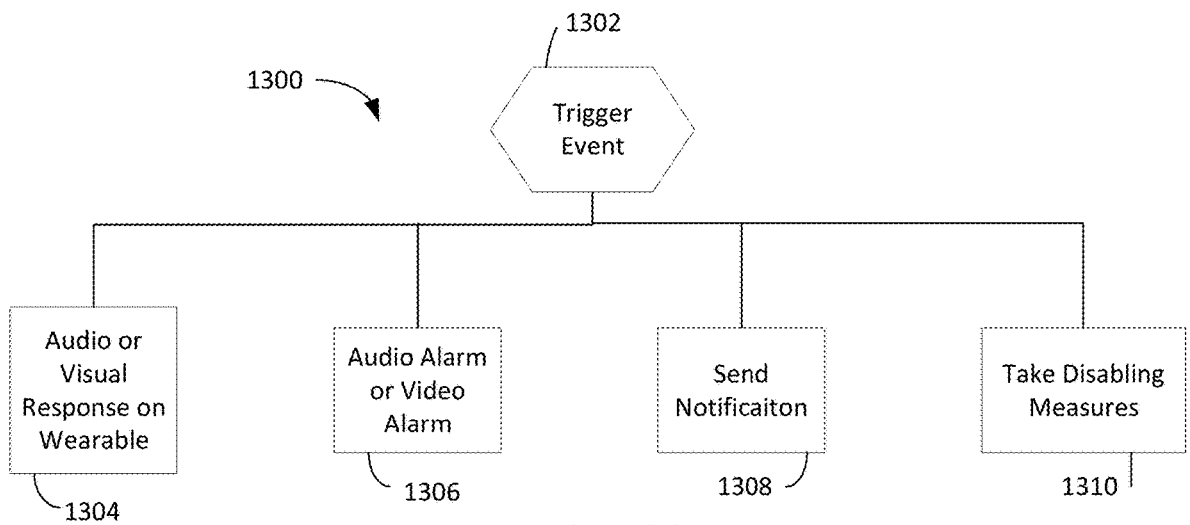
FIGS. 13-16B illustrate flowcharts illustrating steps that may be performed.
Figure 14:
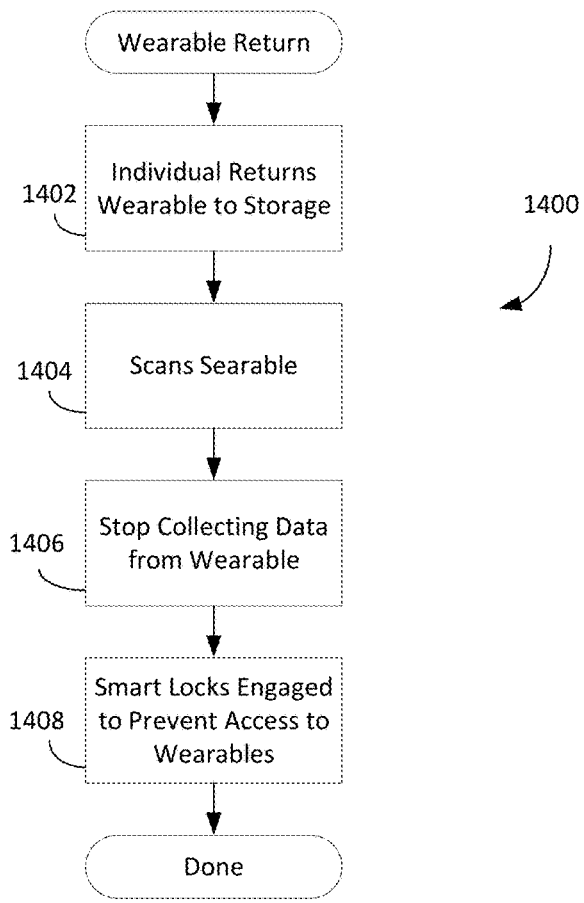
Figure 15:
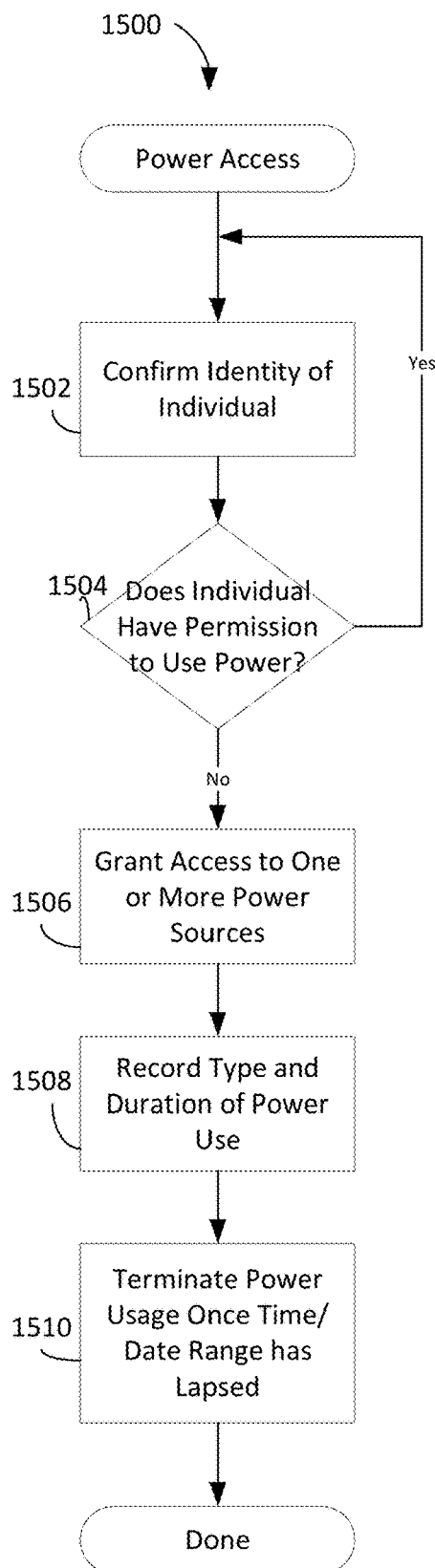
Figure 16A:
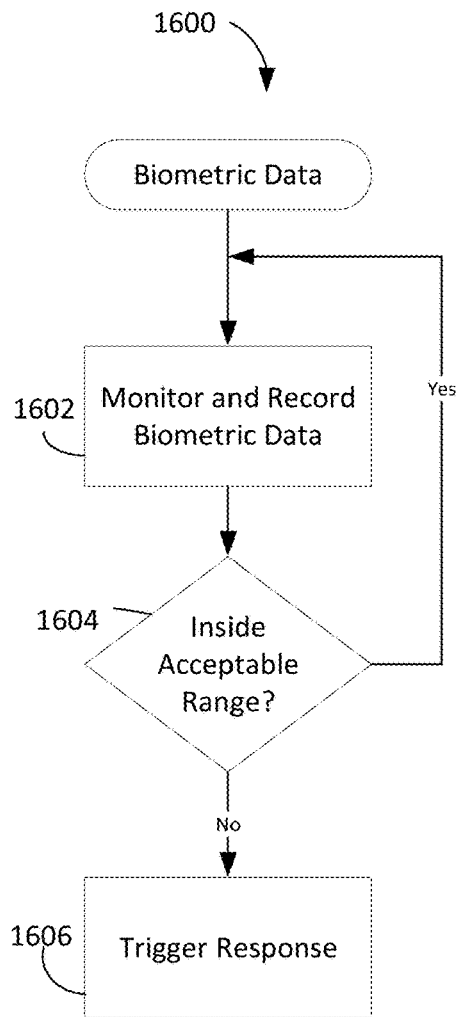
Figure 16B:
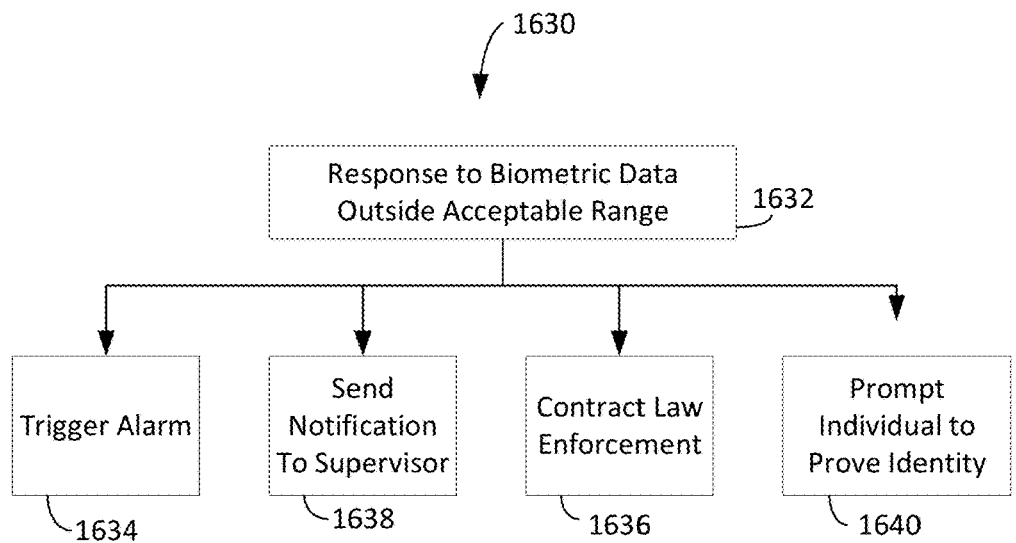

FIG. 12B shows an example of different areas that may be established for geofencing at the construction site 1200. Area A shown a boundary 1210 may include the entirety of the project that is under construction 1206. Area B 1212 may be a portion of the project, such as the kitchen. Area C 1214 may be the shed and area D 1216 may be the entire construction site. Individuals may have access to none of these areas or to a subset of these areas, including all of the areas.

When a worker enters an unauthorized area, an audio or video response can occur on the wearable. For example, a smart vest may include lights that may flash or may be continuously illuminated in response to a party being outside the permitted areas on the construction site. Another option is for an audio alarm or a video alarm to be triggered at the construction site rather than on a wearable. A further option is to send a notification, such as a phone call, a text message, an email message or other notification to a supervisor on or off the construction site. Yet another option is to take disabling measures relative to the individual. The disabling measures could entail triggering locks or disabling equipment by shutting off power or the like.

Figure 17:
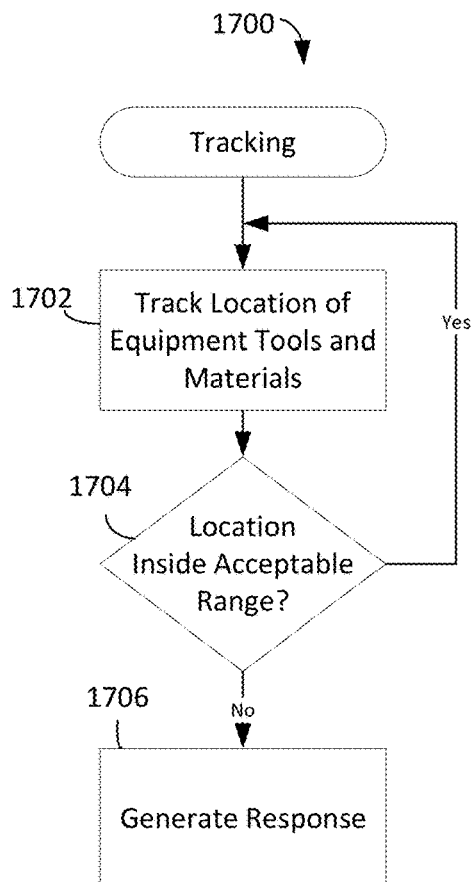
FIG. 17 depicts a flowchart illustrating steps that may be performed.

FIG. 17 shows a flowchart of steps that may be performed relative to such tracking. On an ongoing basis, the system may track the location of equipment, tools or materials at the construction site 1702. The system can check whether the location of the equipment, tools or materials is acceptable or not 1704. For example, suppose that lumber has been delivered to the construction site and the location of the lumber indicates that the lumber is removed from the construction site. This would be problematic and would warrant a response. If the location is not acceptable as checked in 1704, a response is generated in 1706.

Figure 18:
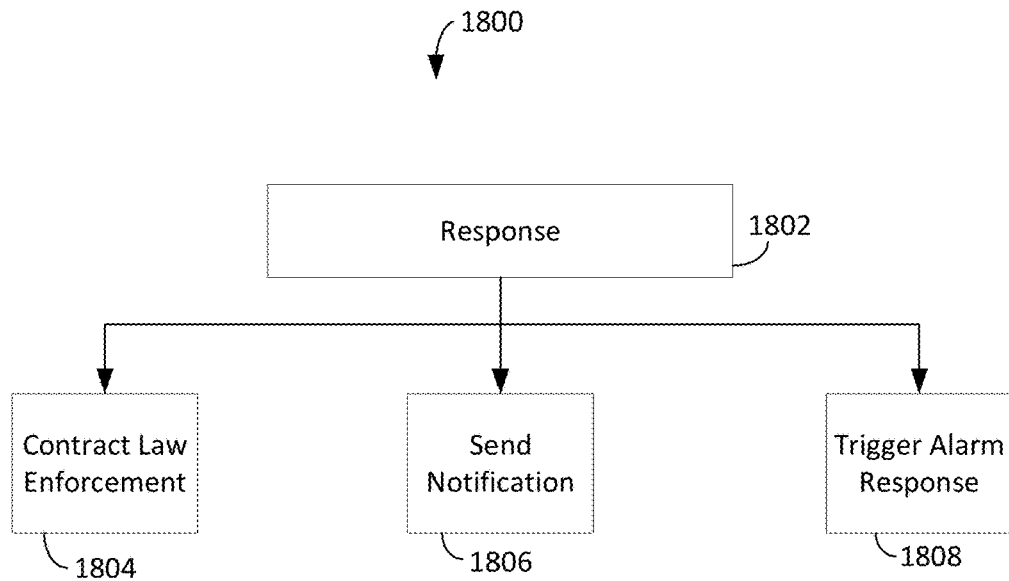
FIG. 18 illustrates possible responses accomplished by the system.

FIG. 18 shows a diagram 1800 illustrating different types of responses 1802 that may be generated in response to the equipment, tools or material in an unacceptable location. One type of response is to contact law enforcement or security 1804. In many cases the location of the tools, equipment and materials may indicate that a theft is underway. Another type of response is to send a notification to supervisor or to other appropriate parties at the construction site 1806. A final type of response is to trigger an alarm response 1808, such as the sounding of an audio alarm or a video alarm.

Figure 19:
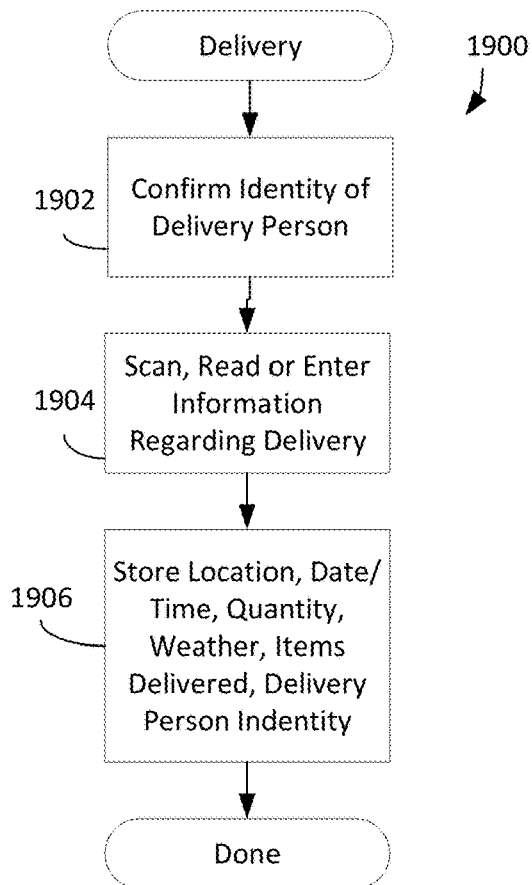
FIG. 19 depicts a flowchart illustrating steps that may be performed.

The system helps manage deliveries to the site. FIG. 19 depicts a flowchart 1900 showing steps that may be performed in this regard regarding deliveries. Initially, the identity of the delivery person is confirmed to indicate that the delivery person is the appropriate party and is permitted access to the construction site 1902. For example, a serial number or other identification indicator may be scanned or read off the delivered items. In addition, information may be entered by the delivery person using the kiosk, such as by entering information via touchscreen 106A (FIG. 1A) 1904.

The location of delivery, the date of delivery, the time of the delivery, the quantity of delivery, the identity of the delivery person and the weather may be recorded as part of the information that is kept regarding the delivery. This information may later be used to track and confirm deliveries as well as to understand the conditions when the delivery was made.

Figure 20:
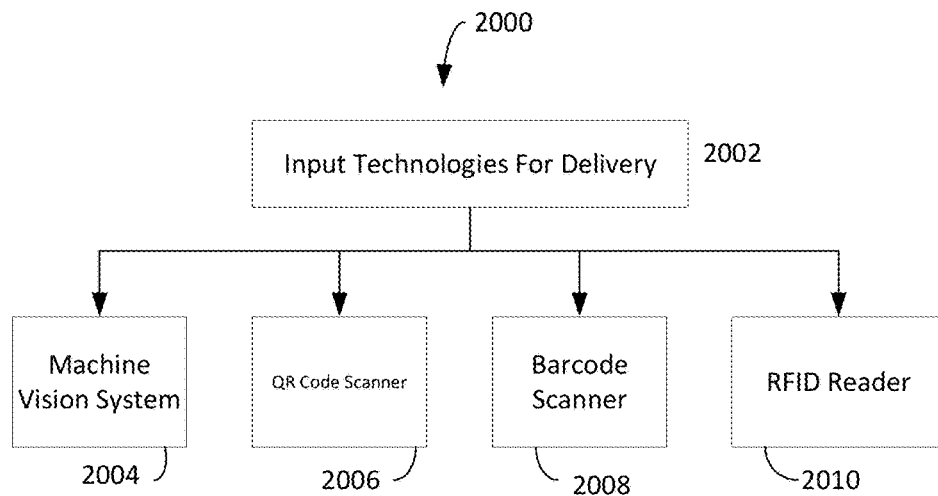
FIG. 20 illustrates different types of input technology.

The deliveries may utilize various scanning and reader technology. In FIG. 1A, a scanner 110A may be provided. Diagram 2000 in FIG. 20 illustrates different types of input technologies 2002 that may be used for assisting gathering information regarding deliveries. A machine vision system 2004 may be provided. The machine vision system 2004 may capture an image of the delivered items and process the image to determine the nature of the items that were delivered as well as the quantity of items. Moreover, the machine vision system may capture an archival image that may be indicative of the state of the items when they were delivered. A QR code scanner 2006 may be used where QR codes are on a delivered items or documentation. Similarly, a bar code scanner 2008 may be used where bar codes are on the items or on documentation delivered with the items. Still further, an RFID reader 2010 may be provided to gather information regarding the delivered items.

Figure 21:
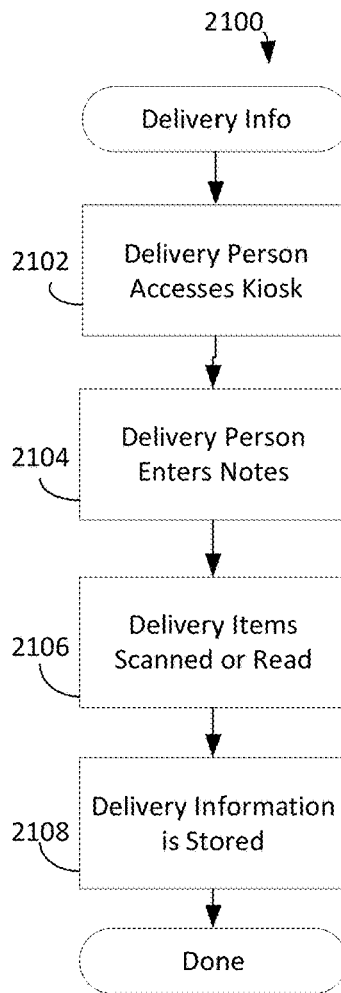

The delivery person may interface with kiosk via touchscreen 106A and 1900 to provide delivery information. Flowchart 2100 of FIG. 21 illustrates some of the steps that may be performed in such an instance. Initially, the delivery person may access the kiosk 2102. The delivery person may enter a note(s) regarding the delivery, such as what was delivered and the state of items that were delivered 2104. This information may be entered, such as through the touchscreen 106A (FIG. 1A). The delivered items are imaged, scanned or read 2106. As was mentioned above, a number of different types of input technology may be used on the delivered items. The result is that delivery information is then stored in records that may be accessed subsequently 2108.

The inspector may interface with the system. FIG. 22 includes a flowchart 2200 illustrating steps that may be performed in such an interaction. Initially, the identity of the inspector may be confirmed using the biometric data 2202 or manually using the touchscreen on the kiosk. The inspector then performs the inspection of the appropriate portion of the construction site 2204. The inspector then accesses the system, such as through the kiosk at 2006. The inspector then may record notes and/or post certificates or notices at the kiosk 2208. Additionally, the inspector may use technology available via the kiosk such as OCR scanner or the like to capture appropriate information the inspector may have written during fulfillment of the reason for being on the site.

The system may include a still camera(s) or a video camera(s) that is part of the system. FIG. 23 provides a flowchart 2300 relating to such access. A software interface to the camera may be provided to enable authorized external parties to gain access to the camera 2302. A party requests access to the camera via the interface over the network 2304. For example, a bank official may wish to view the construction site before authorizing release of funds or before granting a loan. A determination is made whether the party is permitted access by accessing permissions 2306. The system gathers a great deal of information over the course of time. At least a portion of this information is persistently stored to compile a record of activities at the construction site. This record can be useful to prove activities after the fact. The activities that are recorded may drive workflow and scheduling at the construction site to improve efficiency. If the party is permitted access, access is given to the party so that they may receive a captured image or video data 2308. Otherwise, access to the camera by the party is denied 2310.

Figures 24, 25:
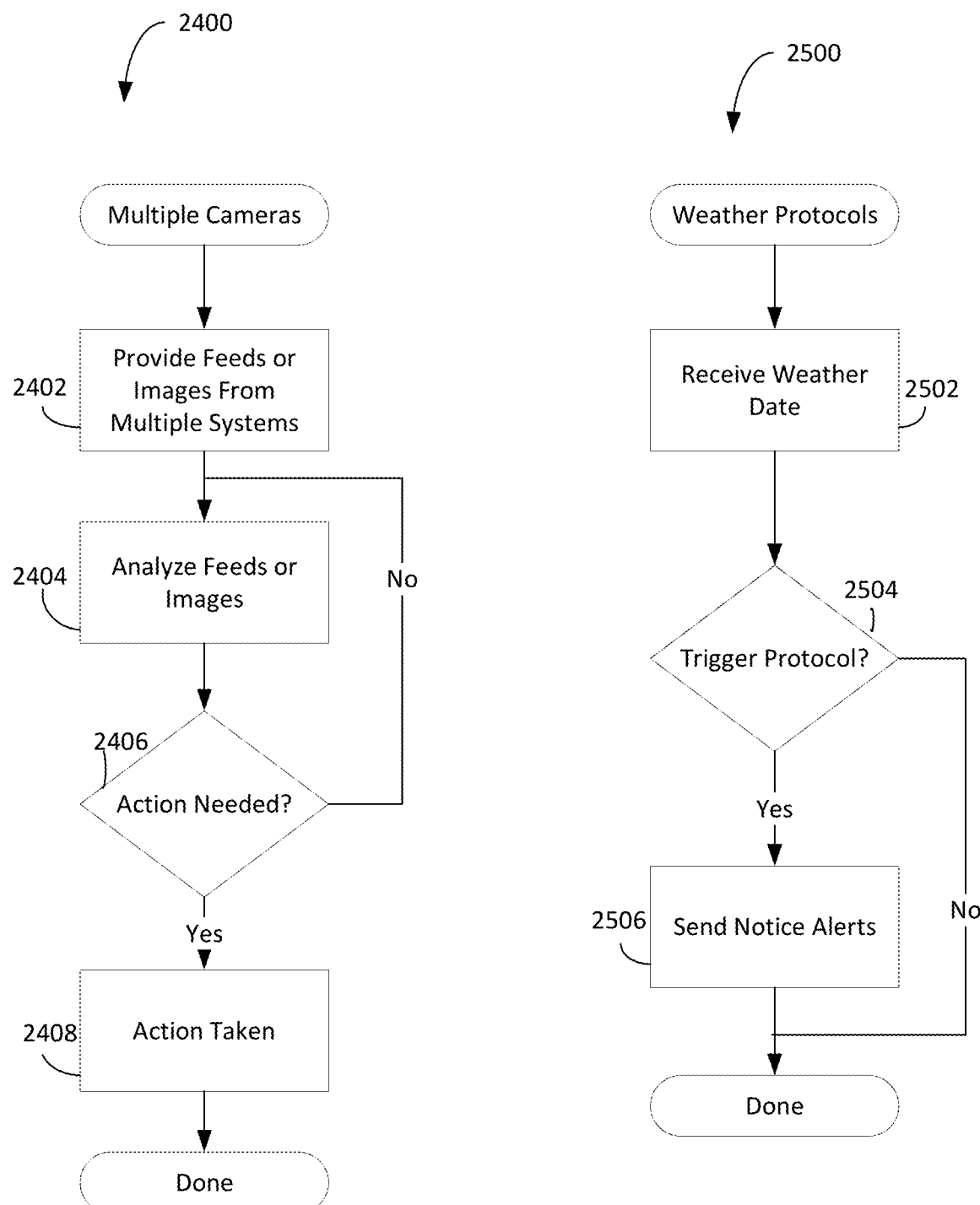

Systems at adjacent locations may be used in conjunction with each other. FIG. 24 shows a flowchart 2400 of steps that may be performed when image capture devices, such as still cameras or video cameras, from multiple adjacently situated systems are used in conjunction in one example application. In particular, video feeds or still images may be obtained from the image capture devices from multiple systems 2402. The video feeds or images may then be processed, such as by the cluster described above, using software such as motion detection software, thermal image analysis or other image analysis software to identify activity that may warrant a response 2404. For example, the analysis may identify a large living object moving near the periphery of multiple construction sites. The system may then, based on the analysis, determine if action needs to be taken 2406. If an action is needed, then the action is taken 2408. If not, the capture of the images or videos may continue. Examples of actions include sounding an alarm, contacting law enforcement, contacting a security team or the like.

The weather conditions may trigger different protocols that are performed by the system. For example, inclement weather, very cold weather or very hot weather may trigger protocols to ensure worker safety and productivity as well as the protection of structures, materials and equipment at the construction site. FIG. 25 shows a flowchart 2500 of steps that relate to such protocols. Initially, the system receives weather data 2502. A check is made whether the weather data values trigger any protocols 2504. If a protocol is triggered, notices and alerts may be sent as part of the protocol to the appropriate parties 2506. For example, if the temperature is over 90° F., a party may be sent a notice to take a break every hour and to hydrate. Related notices may be sent to supervisors. Such notices can be generated according to the product or material specifications in the BOM, when materials are confirming or nonconforming, environmental conditions and other events. For example, if it is too cold, workers may be prompted to wear gloves and hats and to spend time in a heated space every hour. In still another example, if severe weather is approaching, workers may be prompted to secure the construction site and seek a safe location. In a final example, workers may be prompted not to take actions, such as pouring concrete, applying paint or applying stucco, in certain weather conditions.

Figure 26:
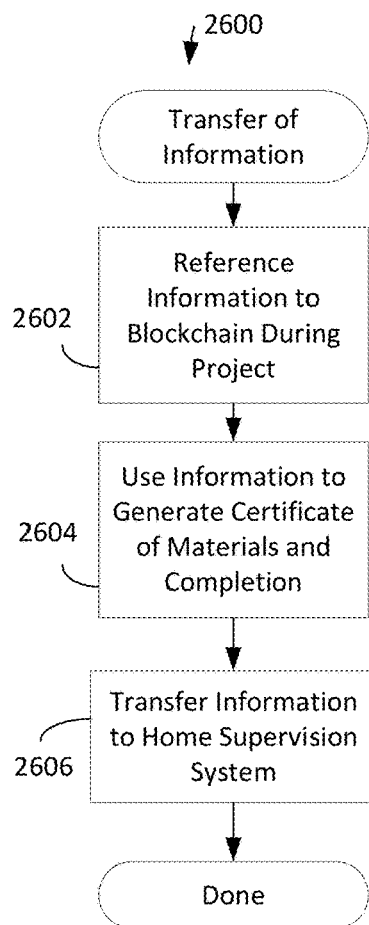

As has been mentioned above, a great deal of information may be stored during the course of the construction project for reference during the project and after the project is completed. FIG. 26 shows a flowchart of steps 2600 that may be performed in exemplary embodiments in relation to the information. The information obtained during the project from many different sources may be stored on or referenced from persistent storage 2602. The information may be stored on an ongoing fashion in databases as describe below and may be referenced in an immutable persistent fashion on the immutable distributed ledger. This information may help resolve disputes between parties involved on the construction project. For example, suppose the construction company asserts that the wrong items were delivered. Since there is a complete record references on the persistent storage of all deliveries, these records may be accessed to resolve the dispute. Insurance providers may access injury records referenced on the persistent storage to settle or confirm claims. Disputes regarding pay among workers may be resolved by checking the recorded hours on site to determine the appropriate pay for the workers. Inspection records may be accessed to confirm that proper inspections were carried out and passed.

When the construction project is complete, information referenced on the persistent storage may be extracted and encapsulated into a certification of materials and completion 2604. The certificate may hold information such as the BIM, the final BOM, worker sequence information, warranties for items in the completed home, confirmation of conditions and qualifications at the time of installation for warranty, punch list completion information, lender information, information regarding the contractors and workers, insurance policy information, inspection history information, ownership history, history of localized events like weather and records of trespassing (such as images) and bills of lading for items delivered during the project. The certificate may be delivered in electronic form and preferably in an immutable format. Alternatively, the certificate may be delivered in paper form. The certificate may be delivered to the owner of the property or to a property manager. In addition, the certificate may be passed to other interested parties, such as an insurance provider or financial institution.

A few examples help to illustrate the value of the certificate. The certificate acts as a complete record of the project. Suppose that an oven in a home fails 3 months after an owner occupies the premises. Since the certificate has complete warranty information, the owner can reference the warranty information and get the oven fixed under warranty. As another example, suppose that gutters on the home leak 6 months after an owner occupies the premises. The owner can reference the certificate to contact the contractor, construction company or manufacturer. The construction company might also have a remedy against the installation contractor based on evidence that materials were not installed properly or the manufacturer if the condition precedent were not confirmed or not met. Further, the bills of lading (BOLs) may indicate that the materials delivered were different from those specified in the BIM and BOM. The certificate may also assist in obtaining a lower insurance premium from a provider because be reducing or eliminating unknowns about the project.

The information referenced in the persistent storage may also be passed to a computing device of the owner 2606. The computing device may be, for example, part of a home supervisor system that manages and controls home systems, such as heating, air conditioning, lighting, an alarm system or the like. The computing device may be part of a smart home controller and may interface with appliances and other items that are interconnected via a home control network. The computing device may include a document management system for securely storing the transferred information.

In exemplary embodiments, information may be gathered from and sent to multiple parties including a managing company responsible for the management and oversight of the construction project, a design company responsible for developing a design for the home and develops the BIM for the project, a supply company analyzes the BIM and develops a BOM for the construction project, and a construction company is responsible for constructing and assembling the home.

Figure 28A:
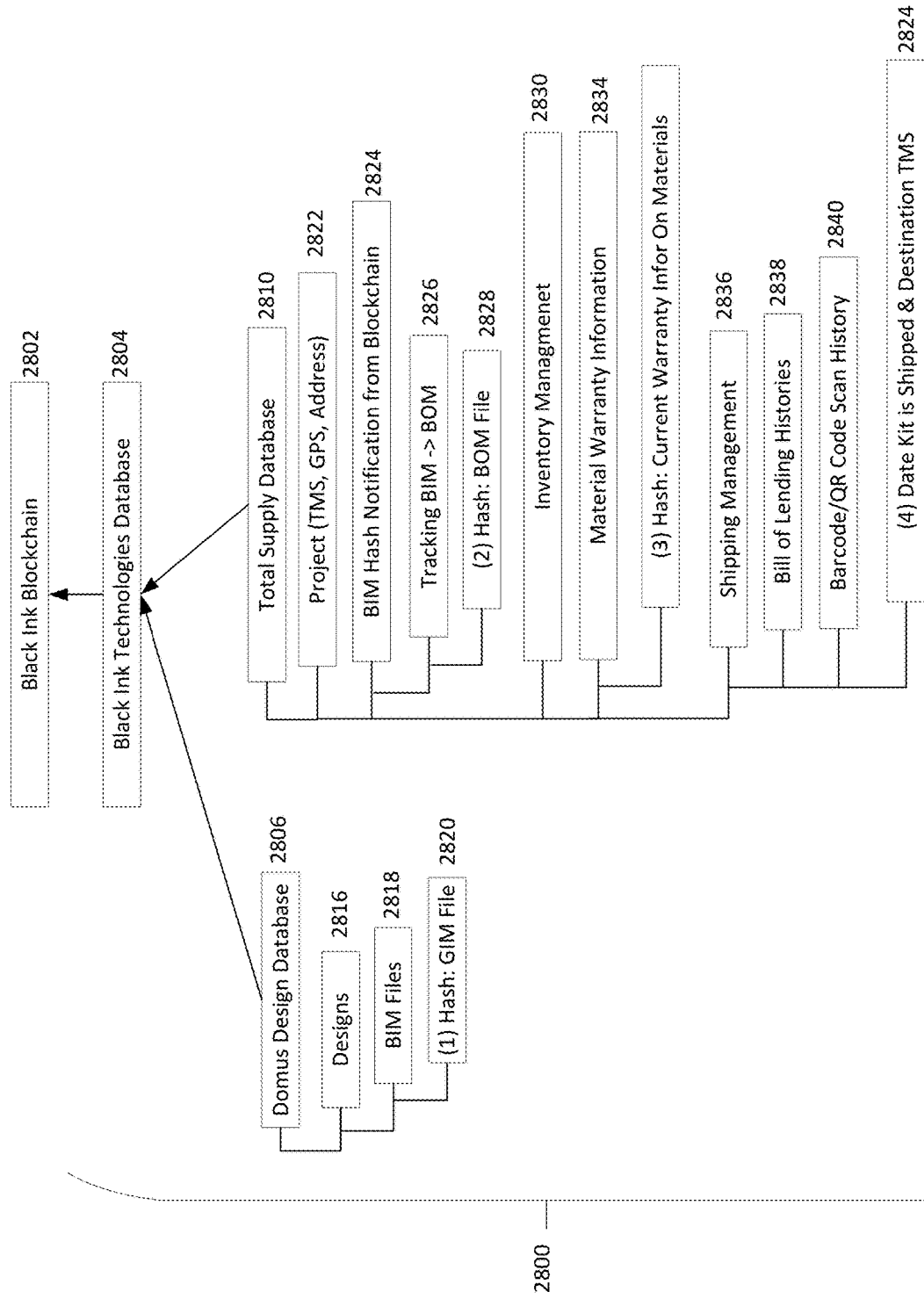
FIGS. 28-29 depict databases that provide reference information.
Figure 28B:
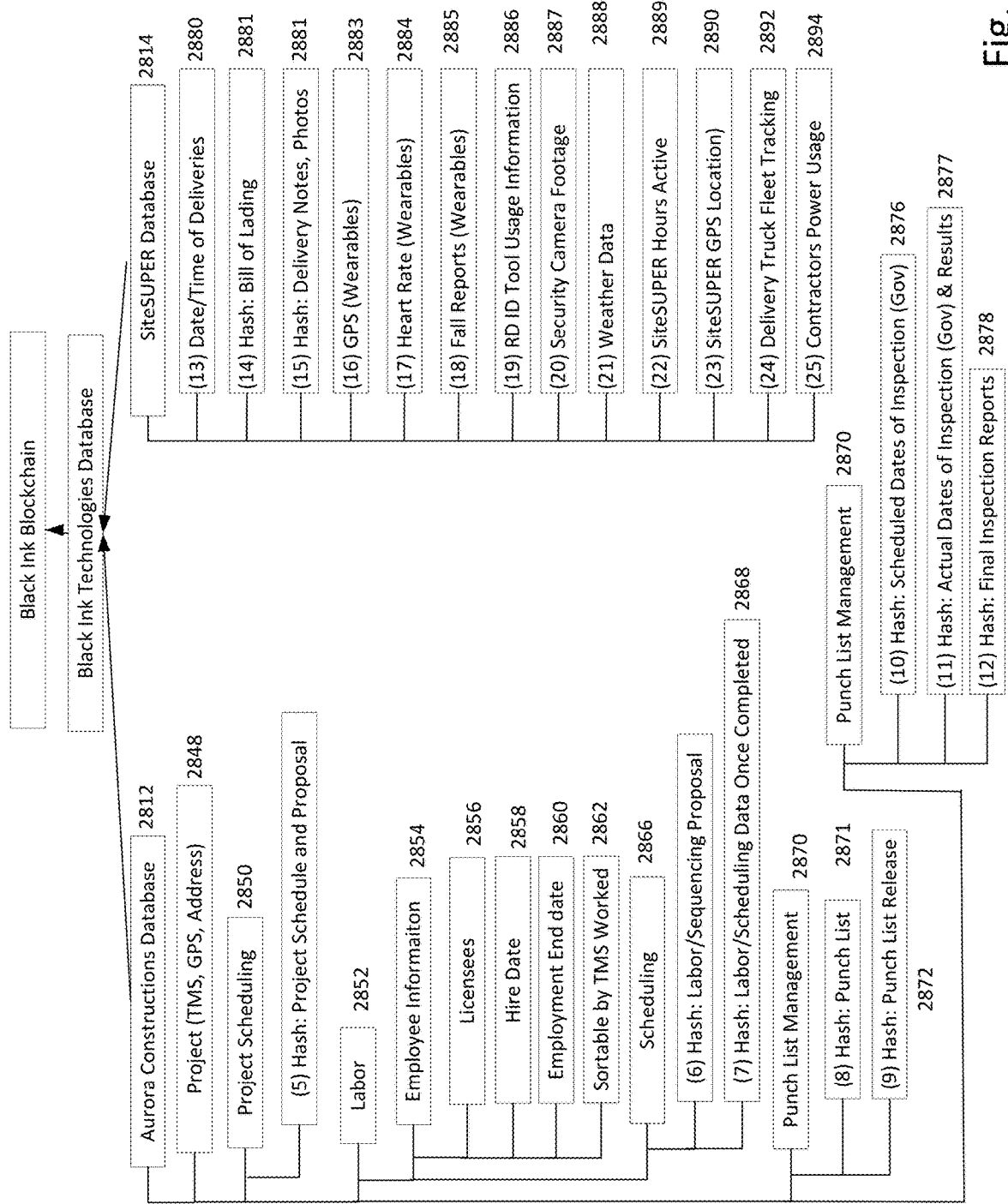

FIG. 28 shows a diagram 2800 depicting possible information from multiple data sources (e.g., databases), some of which may be referenced on the persistent storage 2802. The workflow may be that the data is first stored in a management company database 2804 and then referenced on the persistent storage 2802. The design company database 2806 may hold information that is passed on to the management company database 2804 and ultimately referenced on the persistent storage 2802. The design company database 2806 may hold designs 2816. The designs 2816 may include BIM files for BIMs, as has been discussed above. A hash value resulting from passing the BIM file 2820 for the construction project through a secure hash algorithm may also be stored on the design company database 2806. The BIM file may be hashed using any number of different types of known secure hash algorithms as mentioned above. The hash value of the BIM file may be transferred to the management company database 2804 and then for reference on the persistent storage 2802.

FIG. 28 also shows a supply company database 2810. The supply company database 2810 may hold project information 2822, such as tax map submap (TMS) numbers, GPS data and addresses for construction project properties. The supply company database 2810 may store a BIM hash notification 2824 from the persistent storage 2802, indicating that the hash value for the BIM has been referenced on the persistent storage 2802. Information 2826 tracking the bill of materials (BOM) to the BIM may be stored in the supply company database. As was discussed above, the supply company may analyze and process the BIM to develop of BOM for the project. A hash value 2828 resulting from passing the BOM file through a secure hash function is stored in the supply company database 2810, transferred to the management company database 2804 and referenced on the persistent storage 2802.

The supply company database 2810 may also store inventory management information 2830, such as quantity and the particulars of material inventory and material warranty information for such materials 2832. The warranty information for materials used in the project may be hashed 2834 and the resulting hash value may be stored in storage in the supply company database 2810. The hashed value 2834 may be passed to the management company database 2804 and then referenced on the persistent storage 2802. The supply company database 2810 may also store shipping management information 2836. This may include bill of lading histories 2838 and barcode, RFID values, UHF values and/or QR code scan histories 2840. The bills of lading (BOLs) for the project and the barcode/QR scan codes for delivered items for the projects may be hashed 2842 and the resulting hash value(s) passed to the management company database 2804 for reference on the persistent storage 2802. Further, confirmation of what was specified by designers was delivered to the construction site and installed according to the manufacturer's specifications so that a construction project can be placed under warranty.

A construction company database 2812 may store project information 2846, such as TMS #'s, GPS data and addresses for projects. The construction company database may also hold scheduling information 2848 for the project. This may include detail regarding workflow and timing. A hash value of the project schedule 2850 may be stored on the construction company database 2812, passed to the management company database 2804 and referenced on the persistent storage 2802. The construction company database 2812 may store worker information 2852. The worker information 2852 may include employee information 2854 for workers involved in projects. This employee information 2854 may include information regarding licenses for workers 2856, hire dates for workers 2858, employment end dates for workers 2860 and other information, such as names, photos, etc. The information may be sortable by keys such as TMS # to identify workers for a project. The construction company database 2812 may also store scheduling information 2864 for workers. This information may be used to develop a worker/sequencing proposal that is hashed 2866 and the resulting hash value stored in the construction company database 2812. The hash value 2866 may be passed to the management company database 2804 and referenced on the persistent storage 2802. Worker sequencing data once the labor is completed 2868 may be hashed and the resulting hash value stored in the construction company database 2812 for a project. This hash value 2868 may be passed to the management company database 2804 and referenced on the persistent storage 2802.

Punch list management information 2870 may also be stored in the construction company database 2812. The punch list management information 2870 may include a hash of the punch list for a project 2871 and a hash of punch list releases for a project 2872. These hash values 2871 and 2872 may be passed to the management company database 2804 and referenced on the persistent storage 2802.

Inspection management information 2874 may be stored in the construction company database 2812. Hashes of scheduled dates of inspections 2876, dates of actual inspections and results 2877 and failed inspection reports 2878 for a project may be stored in the construction company database. The hash values 2876, 2877 and 2878 may be passed to the management company database 2804 and referenced on the persistent storage 2802.

Hash values gathered and stored in the site supervisor database 2814 may be passed to the management company database 2804 and referenced on the persistent storage 2802. This may include hash values of information regarding dates and times of deliveries for a project 2880, delivery details for the project 2881 and delivery notes and delivery photos for the project 2882. The hash values may include hash values resulting from passing GPS information for wearables used in the project 2883, heart rate information gathered by wearables for the project 2884, failure reports from the wearables for the project 2885 through hash functions. Additionally hash values resulting from passing RFID tool usage information for the project 2886, security camera footage gathered by the site supervisor for the project 2887, weather data recorded by the site supervisor for the project 2888, hours information for when the site supervisor was active for the project through hash algorithms may be stored in the site supervisor database 2814, passed to the management company database 2804 and referenced on the persistent storage 2802. The hash values may also result from passing GPS location information for the system 2890, tracking information for delivery trucks 2892 and contractor power usage information 2894 through a hash function. Hash values 2890, 2892 and 2894 may be passed to the management company database 2804 and referenced on the persistent storage 2802.

Figure 29:
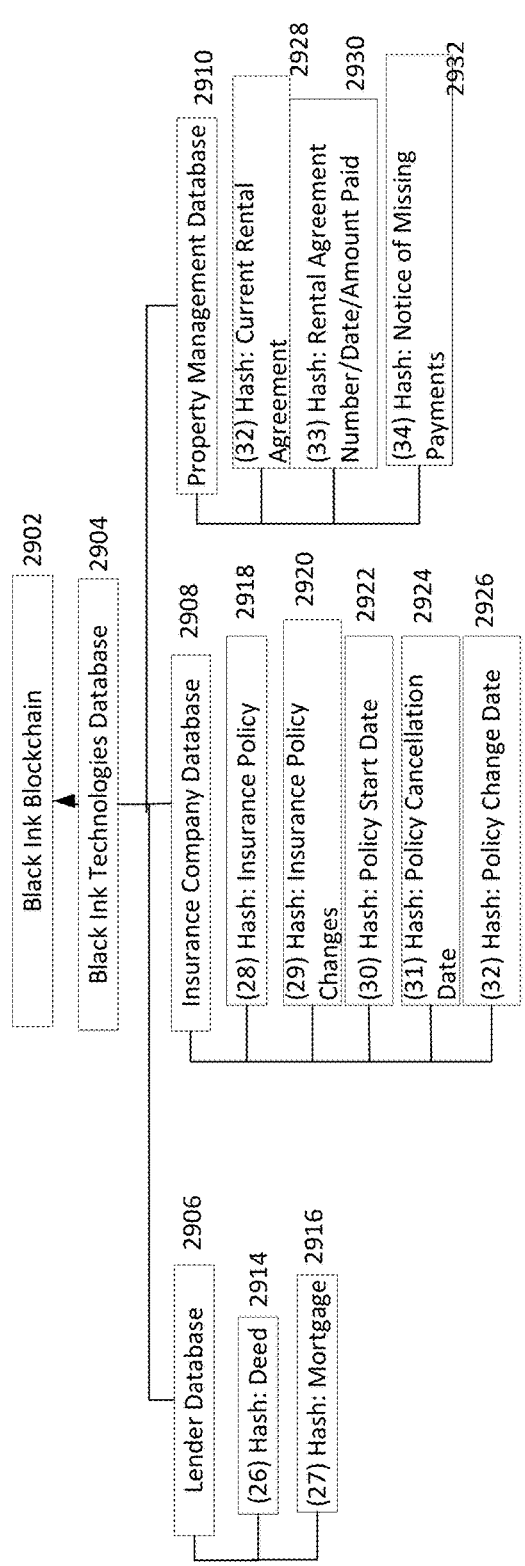

Information referenced on the distributed ledger may also originate from other stakeholders. FIG. 29 shows a diagram 2900 of additional sources of information from other stakeholders. For example, information may originate from a lender database 2906. For example, hashed versions of the deed for the construction site property 2914 and the mortgage 2916 on the construction site property may be stored in the lender database 2906, transferred to the management company database 2904 and referenced on the persistent storage 2902.

Information may originate from an insurance company database 2908. A hash of an insurance policy for the project 2918, a hash of any insurance policy changes for the project 2920, a hash of policy start date 2922, a hash of policy cancellation date 2924 and a hash of policy change dates 2926 may be stored in the insurance company database 2908. The resulting hash values 2918, 2920, 2922, 2924 and 2926 may be transferred to the management company database 2904 and referenced on the persistent storage 2902.

Information may also originate from a property management database 2910. Hashes of a current rental agreement 2928, rental agreement particulars 2930 (such as agreement number, dates and amount paid) and notice(s) of missed payments 2932 may be stored therein. Information can include utility consumption and expenses such as insurance, taxes, maintenance, and the like.

This hash values 2928, 2930 and 2932 may be added to the management company database 2904 and ultimately referenced on the persistent storage 2902.

Figure 30:
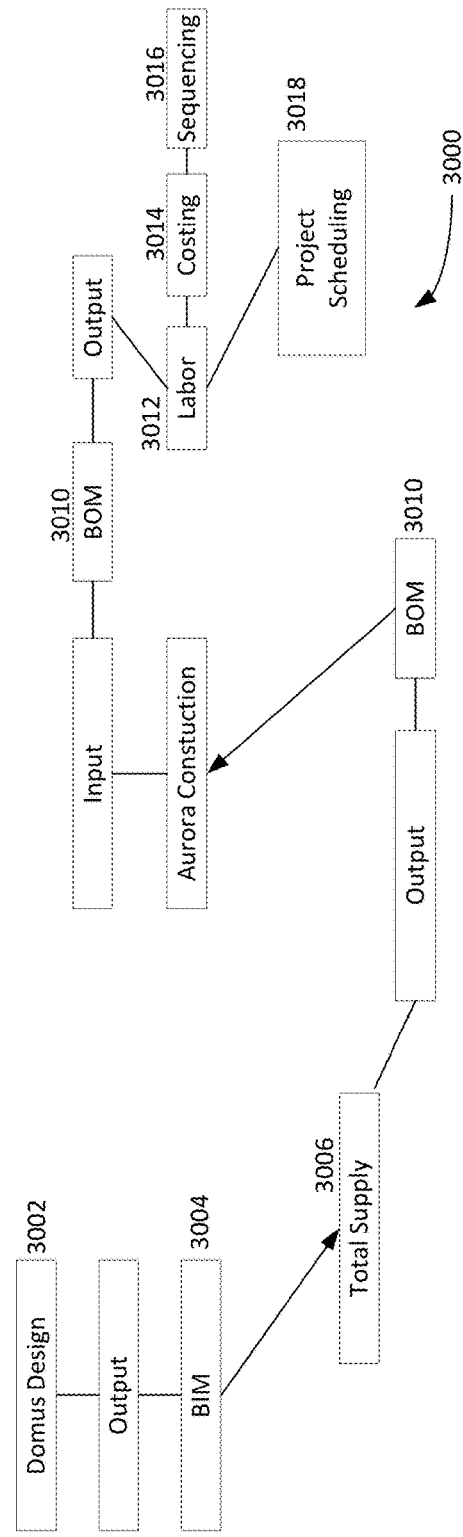
FIG. 30 shows an information flow from of the system.

FIG. 30 shows a diagram 3000 that captures information flow among the design company 3002, the supply company 3006 and the construction company 3012. As was mentioned above the design company 3002 generates a BIM 3004 for the construction project that is passed to the supply company 3006. The supply company 3006 uses information in the BIM 3004 to generate the BOM 3010. The BOM 3010 is then shared with the construction company 3012. The construction company 3012 develops a project schedule 3018. The project schedule 3018 specifies labor needs 3012 for the project, the costs for the labor 3014 and the sequencing of labor 3018 over the project.

Figures 31, 32:
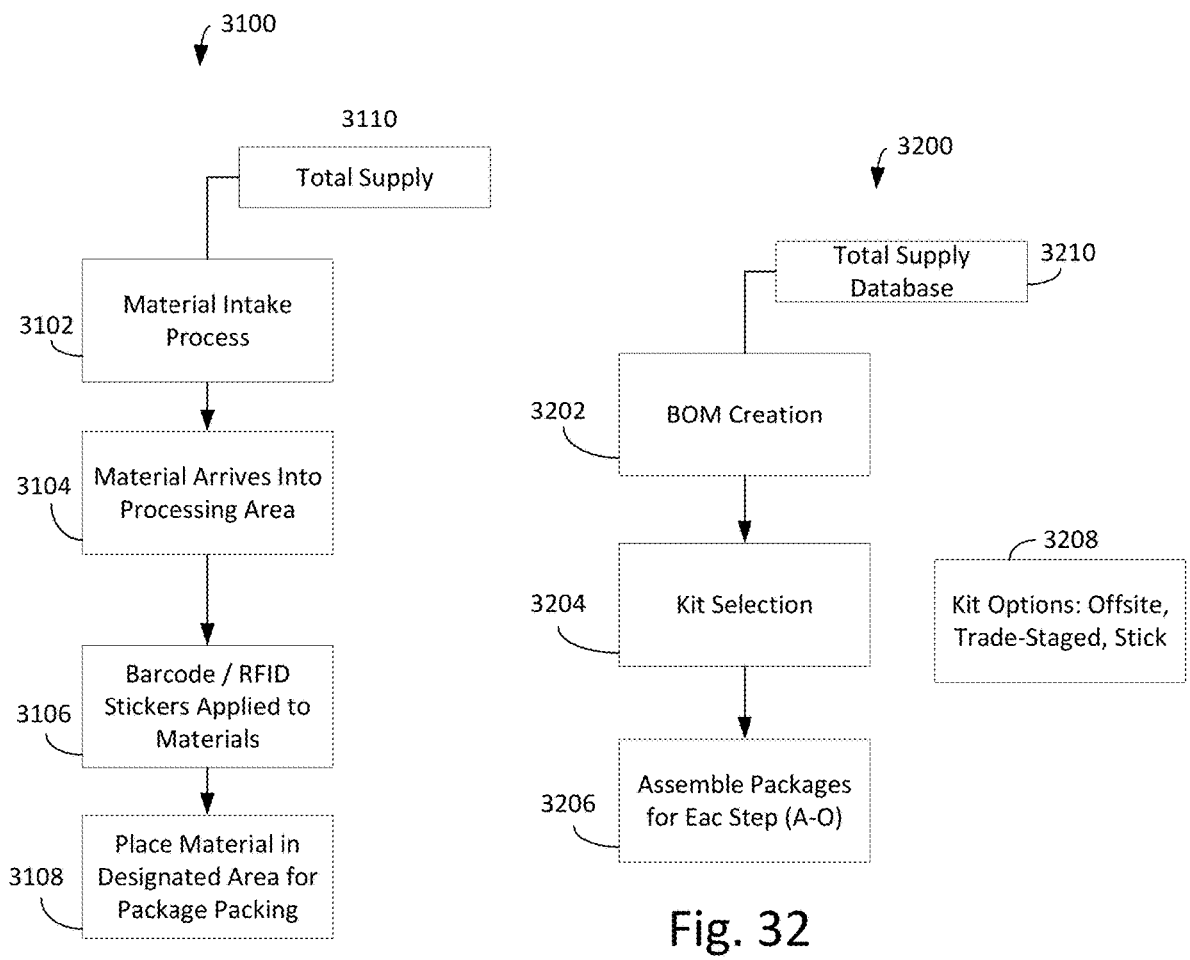
FIGS. 31-33. depict operations performed by system.

The supply company 3110 is responsible for the intake of materials specified in the BOM that are needed for the construction project. FIG. 31 shows a diagram 3100 of steps taken in the material intake process 3102. Materials arrive 3014 at a processing area of the supply company 3110 from the manufacturers and/or distributors. Items such as barcode stickers, QR code stickers, Bluetooth beacons, UHF stickers and/or RFID stickers are applied to the materials 3106 so that the materials may be identified and tracked. The materials with the stickers applied are placed in a designated area for packing 3108. The materials may then be packaged for shipment to the construction site.

As shown in the diagram of FIG. 32, the materials may be organized into kits for particular activities at the construction site. The BOM 3204 is created 3202 and processed to develop the set or group of materials that will be sent to the construction site. Different strategies 3208 may deployed to develop the set of materials. For example, the materials in the set may be staged based on the trade involved (e.g., electrical, plumbing, carpentry) so that each trade has its own set for the stage of construction. Thus, sets are selected 3204, and packages are developed for each step or stage of the construction project 3206.

Figure 33:
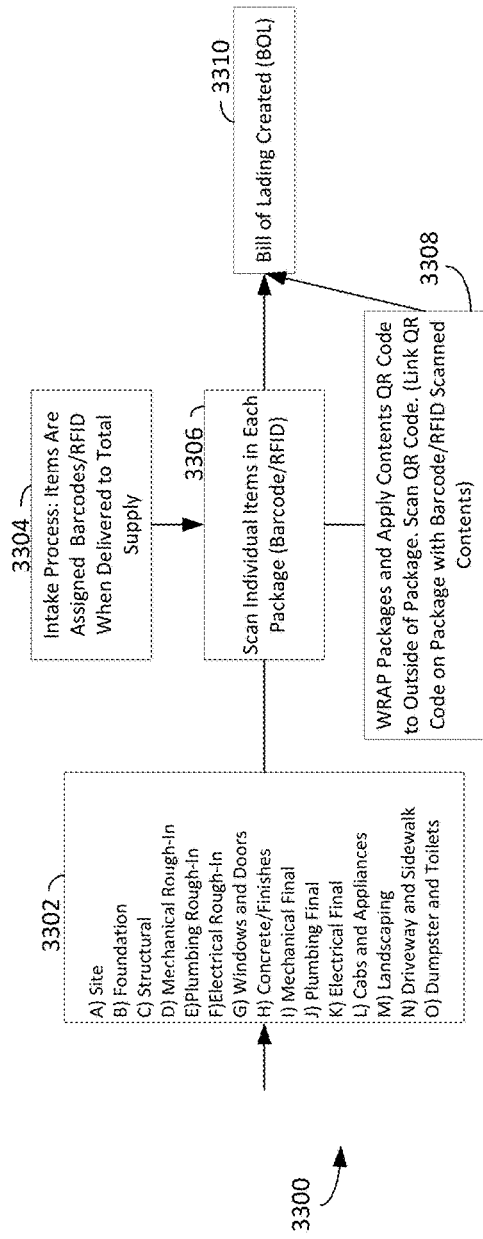

FIG. 33 shows a diagram 3300 depicting additional detail of activity performed by the supply company. The construction project schedule 3302 is organized into stages, such as site preparation, foundation, etc. as shown in FIG. 33. Items may be affixed, such as barcodes, QR codes, RFID identification, Bluetooth beacons and/or UHF identification when the items arrive at the supply company 3304. As was mentioned above, stickers may be affixed to the items to associate the codes with the items. The items in each package may be scanned to record what items are included in the packages 3306. The packages may be wrapped as needed and a QR code sticker may be affixed to the outside of each package 3308. The QR code for each package is scanned 3312. The process may then generate a BOL for each delivery 3310.

Figure 27:
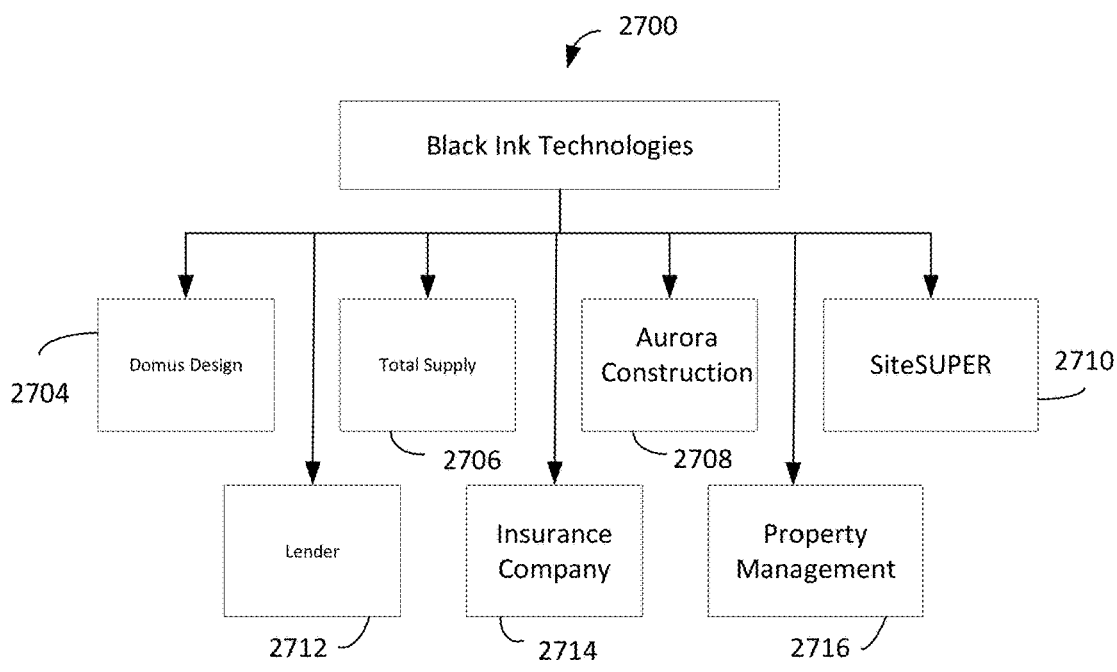
Figure 34:
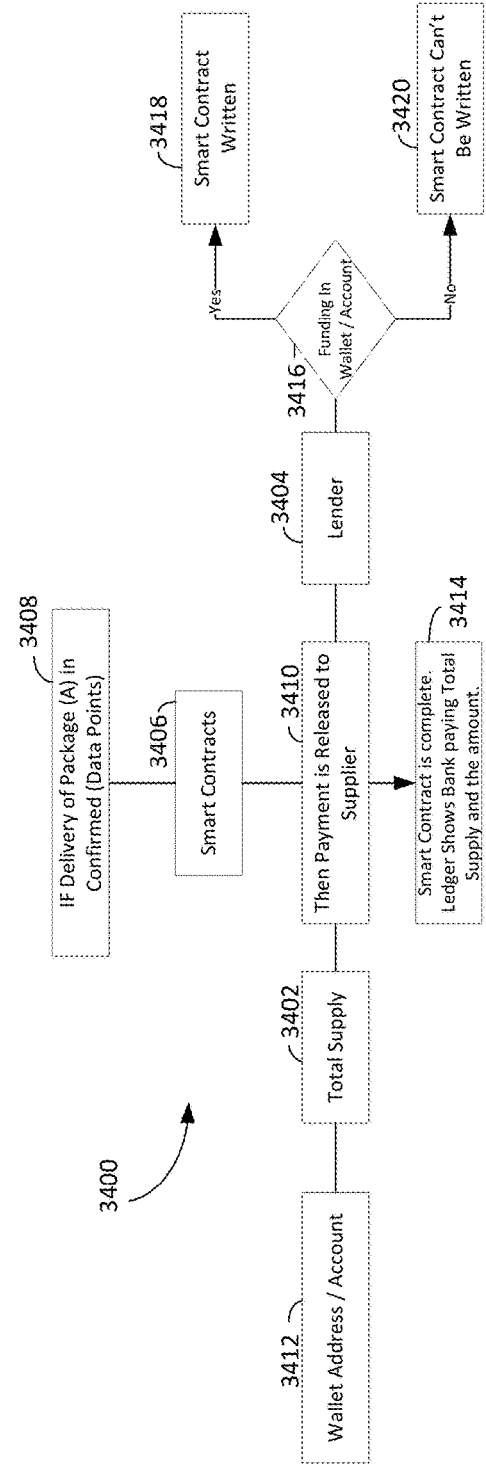
FIGS. 34-35 depict examples smart contracts.

Much of the interactions among the parties shown in FIG. 27 rely upon smart contracts that utilize persistent storage. FIG. 34 shows a diagram 3400 of a first example of interactions relating to a smart contract for the construction project. Suppose that the supply company 3402 makes a delivery to the construction site. Further suppose that the delivery is confirmed 3408 by information such as that gathered by the system as discussed above. The lender 3404 then releases payment 3410 to the supply company 3402. Payments can be made through third party funding, factoring, credit lines, loans or other financial option to assist with financing and cash flow management.

The payment may be made electronically, such as through crypto currencies, like Bitcoin or Ether, or via a stable coin whose value is pinned to an item like a paper currency or the like. A cryptocurrency is a digital currency built with cryptographic protocols that make transactions secure and difficult to forge. Other Suitable forms of electronic payment includes Automated Clearing House (ACH) payment, Electronic Funds Transfer (EFT), card payments, other types of bank transfers or other types of electronic wallet transfer. In the case where crypto-currency is used, the crypto-currency may be delivered to the digital wallet of the supply company at a specified wallet address or account 3412. The ledger may be updated to show that the contract is complete 3414. Payment requires that the lender has sufficient funding in their digital wallet 3416. If not, the smart contract will not be written on the persistent storage 3418. If there is sufficient funding, payment is made, and the contract is written onto the persistence storage as complete at 3420.

Figure 35:
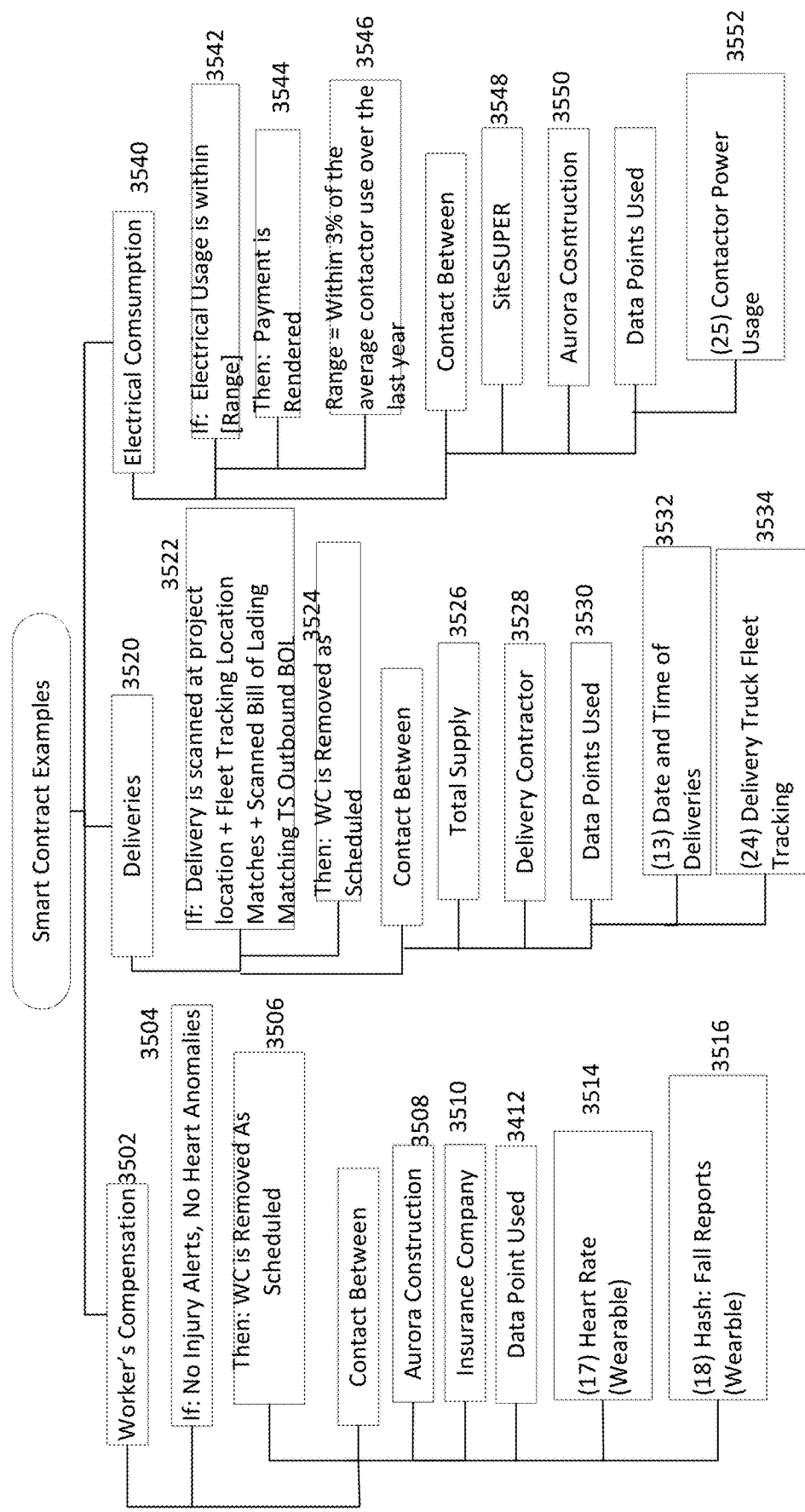

FIG. 35 depicts a diagram 3500 for multiple illustrative smart contracts. In a first illustrative smart contract, the smart contract concerns worker's compensation insurance 3502. The contract removes the insurance for a worker 3506 if there are no injury alerts and no heart rate abnormalities for a given worker 3504. The smart contract can be between entities such as employers (e.g. a construction company) 3508 and an insurance company 3510. The contract looks at the data points 3512 of the heart rate history 3514 gathered by a wearable for the worker and any fall reports 3516 from a wearable for the worker. As mentioned above, the wearables may include a gyroscope or other mechanism that provides data indicative of a fall. This data may be processed to identify data indicative or a fall or other incident where an injury may have occurred.

A second illustrative smart contract shown in FIG. 35 relates to payment for a delivery 3520. If a scan is made at the delivery site, if the fleet location tracking information matches the desired delivery site location and if the scanned BOL at the delivery site matches the outbound BOL from the supply company 3522, then payment from the supply company 3526 to the delivery contractor 3528 is made. Data 3530 used by this illustrative smart contract 3530 includes date and time of deliveries 3532 and delivery truck fleet tracking information 3534.

A third illustrative smart contract shown in FIG. 35 relates to electrical consumption 3540. If the electrical usage by a contractor of the construction company is within a range of 3% of the average contractor use over the past year 3542 and 3546, then payment is provided 3544 by the construction company 3550 to the system 3548. The contractor power usage data 3552 is reviewed.

There is a relationship between the smart contracts and the project schedule. FIG. 36 depicts a flowchart 3600 illustrating steps performed relating to the project schedule and smart contracts. Initially, the project schedule is received 3602. As was discussed above, the construction company forms the project schedule based in part on the BIM and BOM. Based on the project schedule, smart contracts may be constructed that use the persistent storage for contractual arrangements associated with the construction project 3604. The smart contracts are implemented in software and in this case are used to provide electronic payments to parties 3606 for activities relating to the construction project using, for example, electronic payments, crypto currencies, fiat currencies and other forms of payments. The smart contracts may specify the conditions required for payment and may specify the amounts of payment.

FIG. 37 shows a flowchart 3700 depicting steps performed for construction work in the construction project. Initially a smart contract may be initiated that uses the blockchain-based distributed ledger, where the smart contract is for at least a portion of the construction work for the construction project 3702. An inspection of work performed under the contract takes place and information regarding the inspection is passed through a hash function resulting in a hash value. The hash value may be referenced on the blockchain-based persistent storage 3704. The information may include, for example, the name of the inspector, the date of the inspection, an identification of what was inspected, an indication of whether the inspection was passed, any inspection notes from the inspector and an identification of any defects that cause a fail inspection and how to remedy. A notice is received at the system that a portion of the project is complete 3706. The inspection information is assessed 3708. If the inspection information indicates that the inspection was passed 3710, then payment may be provided 3712 to the construction company via smart contract for the portion of the construction project. In contrast, if the inspection was unsuccessful, a notice of the failure and a notice of issues that need to be addressed may be sent, hashed and resulting hash value may be referenced on the blockchain-based persistent storage 3714 for review by the construction company. The construction company may then attempt to remediate the problems 3716 and repeat the above described steps beginning with a new inspection and reference to a hash value for information regarding the new inspection on the distributed ledger 3704.

Figures 38, 39:
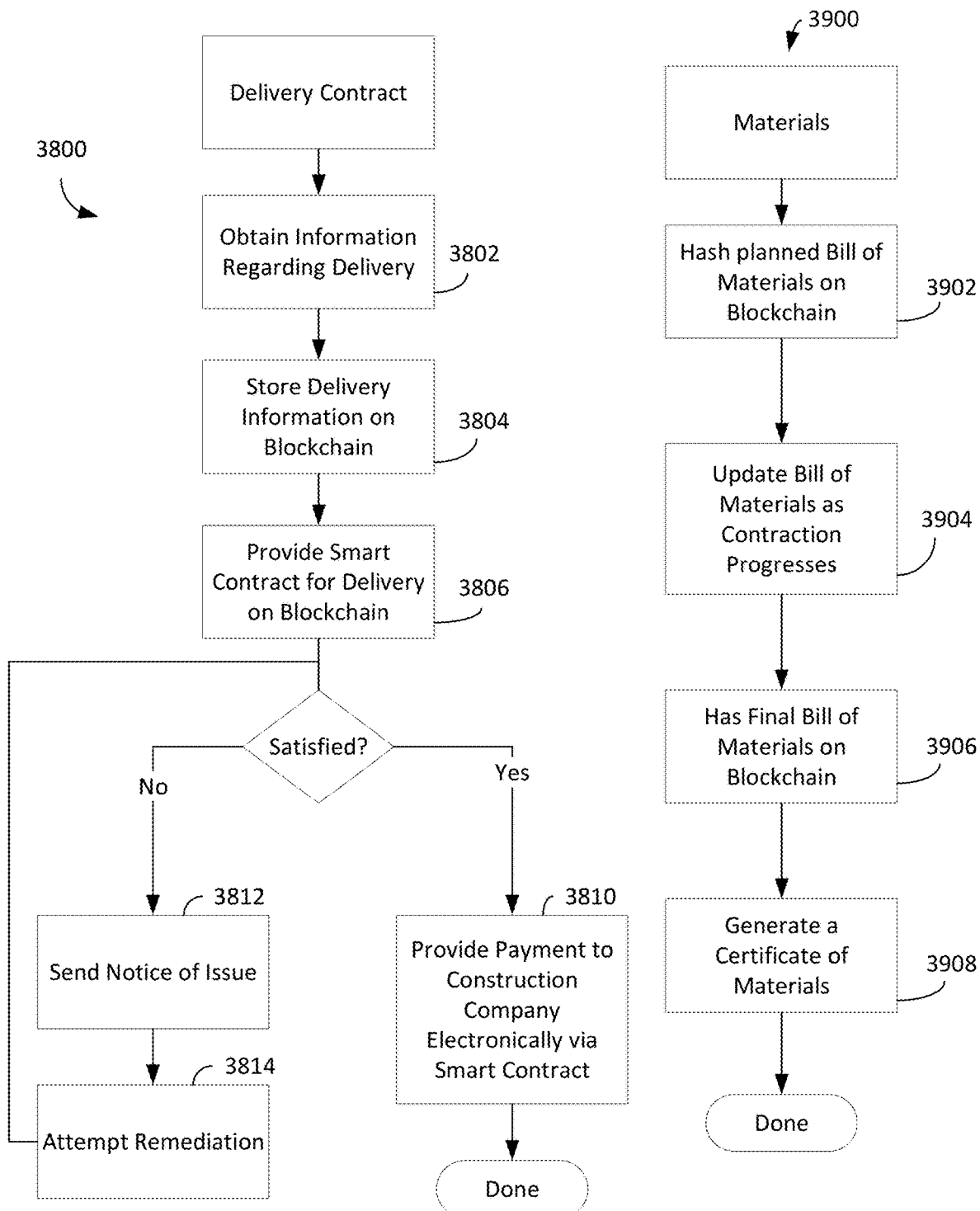

Smart contracts may also play a role with deliveries. FIG. 38 provides a flowchart 3800 concerning steps performed in relation to deliveries relating to such smart contracts. First, delivery and/or materials information is obtained regarding delivery to the construction site for the construction project 3802. The information obtained can include is the materials delivered match the BOM, manufacturer, supplier which can be confirmed by multiple parties.

The delivery information is hashed, and the resulting hash value is referenced on the blockchain-based persistent storage 3804. A smart contract is provided that uses the immutable distributed ledger 3806. A determination is made whether the conditions specified in the smart contract are satisfied 3808. If the conditions are satisfied, electronic payment for the delivery is realized 3810. If the conditions are not satisfied, notice of outstanding issues are sent and the delivery contractor may attempt to remedy the issues 3814. The process may then repeat beginning with step 3808 until the conditions are satisfied.

One of the benefits of the approach adopted by the exemplary embodiments described herein is that a complete record of materials used in the home of the construction project is maintained. FIG. 39 shows a flowchart of steps that are performed regarding such materials. Initially, the planned BOM generated by the supply company is hashed and the hash value is referenced on the blockchain-based persistent storage 3902 as described above. The BOM is updated as the construction progresses until the construction is complete 3904. When construction is complete, the final BOM is hashed and the hash value is referenced on the blockchain-based persistent storage 3906. The information in the final BOM is used to generate the certificate of materials provided to the owner of the home resulting from the construction project 3908.

As has been discussed above, worker's compensation insurance may be adjusted as workers are added and removed from the workforce for the construction project with the assistance of smart contracts. FIG. 40 provides a flowchart 4000 of steps performed relative to worker's compensation insurance. A smart contract is provided for worker's compensation insurance 4002 between the insurance provider and the construction company. Payment for the insurance may be held in escrow 4004 and funds may be added/deleted as warranted. When confirmation is received that workers are at the site to work 4006, the insurance is put in place and payment is received 4008 by the insurance provider for the insurance from escrow on behalf of the construction company. When notice is received that a worker or workers is/are no longer to be covered by the insurance 4010, a communication is generated to the insurance provider that no longer need coverage for the worker(s) 4012. An indication is received and hashed to produce a hash value that may be referenced on the blockchain-based persistent storage that the worker is no longer covered by the insurance 4014 and any adjustments in the insurance premiums may be made to the escrow account 4016.

Liens are often used in construction. The exemplary embodiments enable the triggering and releasing of such liens to be automated. FIG. 41 shows a flowchart 4100 of steps that may performed regarding liens. Initially, notice of a first event is received 4102 at the systems or at a server in a cloud environment. A programmatic determination is made that the event is a lien triggering event 4104. For example, suppose a supply company delivers items to a construction site. The supply company may have a lien on the items until payment is received. A communication is generated and sent that a lien is needed 4106. This communication may be sent to the involved parties. In some instances, where the lien is not in place, the communication may be sent to legal counsel or the like to perfect the lien. Notice of a second event may be received 4108. The second event may programmatically be determined to be a lien releasing event 4110. A communication is generated and sent to the proper parties to release the lien 4112.

Figures 42, 43:
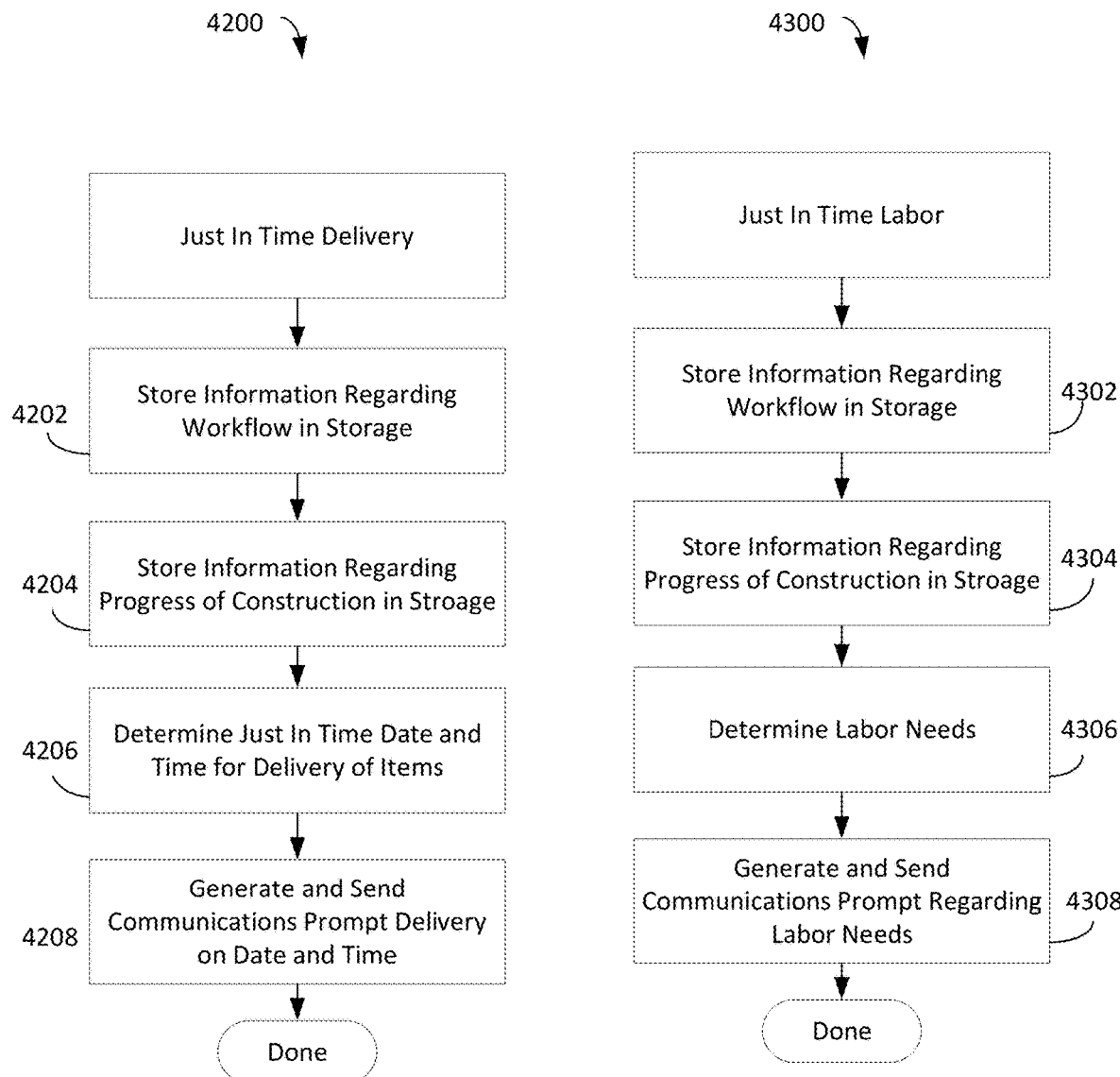

Because of the tracking of construction progress and the automated scheduling, exemplary embodiments may provide for just in time (JIT) delivery. JIT delivery ensures that items are delivered when needed and are not delivered late causing delays. Moreover, JIT delivery ensures that items are not delivered too early and thus unnecessarily exposed to the elements, be susceptible to theft or occupy needed storage space. FIG. 42 shows a flowchart 4200 of steps performed to realize such JIT delivery scheduling. As has been discussed above, information regarding workflow is stored in storage 4202. The workflow specifies what items are needed and when the items are needed. The exemplary embodiments keep track of how a project is progressing and stores information in storage regarding the progress 4204. Based on this information delivery of items can be scheduled just in time 4206. A communication is generated and sent to prompt the delivery to occur when scheduled 4208.

The exemplary embodiments also support JIT labor where the labor arrives on site when they are needed. FIG. 43 shows a flowchart of steps that may be performed to realize JIT labor. The workflow for the project specifies what quantity of labor is needed and when the labor is needed. The workflow information is stored in storage 4302, as is information regarding the progress of the project 4304. Based on the stored workflow and progress information, labor needs are determined 4306. A communication is generated and sent to prompt the laborers to be scheduled for work on specified dates/times when they are needed 4308.

What is claimed is:

1. A computerized system for administration and management of a construction project at a construction site comprising:

a server having a server computer readable medium and in communication with a persistent storage adapted to communicate with a design computing device and a supplier computer device;

a set of server computer readable instructions stored on the server computer readable medium that, when executed by a processor, are adapted for: receiving a building information model from the design computer device having an architectural design and regulatory code associated with a construction site and a bill of materials representing a set of materials to be used at the construction site according to the architectural design and a building material manufacturing specifications, storing the building information model on the persistent storage, transmitting the bill of material to the supplier computer device disposed remotely from the construction site, receiving a material delivery information representing that the set of materials to be used at the construction site has been physically delivered, and receiving material installation information representing that the set of materials at the construction site has been installed at the construction site in compliance with a regulatory code and the building material manufacturing specifications, storing the material installation information on the persistent storage;

a site computer device disposed remotely from the server, having a site input interface and in communication with the server and attached to the construction site;

a set of site computer readable instructions embodied on the site computer device that, when executed by a site processor, are adapted for: determining the physical location of the site computer device, receiving the bill of materials from the server, receiving the material delivery information from the site input interface at the construction site, receiving the material installation information from the site input interface, receiving an internal inspection information from an inspector, and, transmitting the physical location of the site computer device, material delivery information, the material installation information and the internal inspection information to the server.

2. The computerized system of claim 1 wherein the set of server computer readable instructions include instructions for: receiving an internal inspection information from the site computer device representing that an installation of the set of materials is in compliance with at least one of the architectural design, the bill of materials, the regulatory code and a manufacturing specification, and creating a certification of code compliance according to the building information model, the material delivery information, the material delivery information, and the internal inspection information.

3. The computerized system of claim 1 including
an external inspection computer device in communication with the server; and,
wherein the set of server computer readable instructions include instructions for: transmitting an external inspection information request to the server, receiving an external inspection information from a second inspector, receiving an external inspection information from the site computer device representing an installation of a set of material as installed is in compliance with at least one of the architectural design, the bill of materials, the regulatory code and the building material manufacturing specifications, transmitting an external inspection information confirmation to the external inspection computer device and creating a certification of code compliance according to the building information model, the material delivery information, the material delivery information and the external inspection information.

4. The computerized system of claim 3 wherein the set of server computer readable instructions include instructions for debiting a first account associated with the construction site and crediting a second account associated with an external inspector.

5. The system of claim 1 wherein:
the set of server computer readable instructions are configured to store the bill of materials on the persistent storage; and,
the supply computer device is configured to retrieve the bill of materials from the persistent storage.

6. The system of claim 1 wherein:
the site computer device is in communication with the persistent storage; and,
the set of site computer readable instructions is configured to store the material delivery information, the material installation information, the internal inspection information and the internal inspection information on the persistent storage.

7. The system of claim 1 including:
a reader in communication with the site computer device and configured to receive information from a tracking device; and,
wherein set of site computer readable instructions are configured to receive material delivery information from the tracking device associated with the set of materials.

8. The system of claim 7 wherein the reader is selected from the group consisting of: radio frequency identification (RFID) detector, ultra-high frequency (UHF) detector, a bar code scanner, a QR code scanner, near frequency communication (NFC) device; an optical character recognition (OCR) device and any combination thereof.

9. The system of claim 1 including:
a weather station in communication with the site computer device configured to record a weather information at the construction site,
the set of site computer readable instructions are configured to capture a installation weather at the construction site at a time that the set of materials is installed at the construction site and associate installation weather with an installation of the set of materials and transmit the installation weather to the server, and,
the set of server computer readable instructions are configured to create a certification of code compliance according to the installation weather being in compliance with the building material manufacturing specifications for the set of materials installed at the construction site.

10. The system of claim 1 wherein the set of site computer readable instructions are configured to compare the bill of materials with the material delivery information and determine any material discrepancies.

11. The system of claim 10 wherein the set of site computer readable instructions are configured to generate a material discrepancy notification according to any material discrepancies.

12. The system of claim 11 wherein the set of site computer readable instructions are configured to transmit the material discrepancy notification to a third party.

13. A decentralized computerized system for administration and management of a construction project comprising:
a server having a server computer readable medium and in communications with a site computer device and disposed remotely from a construction site;
wherein the site computer device is disposed remotely from the server, affixed to the construction site and includes a site computer readable medium;
a set of server computer readable instructions stored on the server computer readable medium that, when executed by a processor included in the server, are configured to: receive a building information model from a design computing device in communication with the server including an architectural design in compliance with a regulatory code associated with a construction site and a bill of materials representing a set of materials to be used at the construction site, receive from the site computer device a material delivery information representing that the set of materials to be used at the construction site has been physically received at the construction site, receive from the site computer device a material installation information representing that the set of materials to be used at the construction site has been physically received at the construction site, receive an internal inspection information from the site computer device representing that installation of the set of material is in compliance with at least one of the architectural design, the bill of materials, and the regulatory code, receive an external inspection information from the site computer device representing that the installation of the set of material is in compliance with at least one of the architectural design, the bill of materials, and the regulatory code, create a certification of code compliance according to the building information model, the material delivery information, the material installation information, the internal inspection information and the external inspection information, and, store the certification of code compliance on the server computer readable medium;

an immutable ledger in communication with the site computer device; and, a set of site computer readable instructions that, when executed by a site processor included in the site computer device, are configured to: detect the physical location of the site computer device, receive the bill of materials from the server, receive the material delivery information from a site input interface included in the site computer device, receive material installation information from the site input interface, receive the internal inspection information from a first inspector, receive the external inspection information from a second inspector, and store the material delivery information, the material installation information, the internal inspection information and the external inspection information on the site computer device.

14. The system of claim 13 including:

a reader in communication with the site computer device and configured to receive information from a tracking device; and, wherein set of site computer readable instructions are configured to receive material delivery information from the tracking device associated with the set of materials.

15. The system of claim 14 wherein the reader is selected from the group consisting of: radio frequency identification (RFID) detector, ultra-high frequency (UHF) detector, a bar code scanner, a QR code scanner, near frequency communication (NFC) device, an optical character recognition (OCR) device and any combination thereof.

16. The system of claim 15 wherein the set of site computer readable instructions are configured to compare the bill of materials with the material delivery information and generate a material discrepancy notification.

17. The system of claim 16 wherein the set of site computer readable instructions are configured to store the material discrepancy notification on the site computer device.

18. The system of claim 13 wherein:

the server is in communication with a persistent storage; and, the set of server computer readable instructions are configured to store the certification of code compliance on the persistent storage.

19. A decentralized computerized system for administration and management of a construction project comprising:

a server having a server computer readable medium and in communications with a persistent storage;

a set of server computer readable instructions stored on the server computer readable medium that, when executed by a processor, are configured to: receive a material delivery information from the persistent storage representing that a set of materials to be used at a construction site were physically delivered to the construction site, retrieve an internal inspection information from the persistent storage representing that installation of the set of materials at the construction site are in compliance with at least one of an architectural design, a bill of materials, a manufacturing specification, and a regulatory code, retrieve an external inspection information from the persistent storage representing that installation of a set of materials are in compliance with at least one of an architectural design, a bill of materials, a manufacturing specification, and a regulatory code, create a certification of code compliance according to the material delivery information, the internal inspection information and the external inspection information, and store the certification of code compliance on the persistent storage;

a site computer device physically attached to a construction site, disposed remotely from the server, and in communication with the persistent storage;

a site input interface included in the site computer device for receiving input into the site computer device, a set of site computer readable instructions included in the site computer device that, when executed by a site processor included in the site computer device, are configured to: determine the location of the site computer device, receive the material delivery information from the site input interface, receive the internal inspection information from the site input interface representing an inspection from a first inspector, receive the external inspection information from the site input interface representing an inspection from a second inspector, and store the material delivery information, internal inspection information and the external inspection information on the persistent storage.

20. The system of claim 19 including a kiosk configured to contain the site computer device, wherein the kiosk is physically affixed to the construction site during the construction project and contains the site input interface.

* * * * *